US008112000B2

(12) United States Patent
Nishino et al.

(10) Patent No.: US 8,112,000 B2
(45) Date of Patent: Feb. 7, 2012

(54) ELECTRONIC DEVICE

(75) Inventors: Naoyuki Nishino, Kanagawa (JP);
Yasunori Ohta, Kanagawa (JP); Eiichi Kito, Kanagawa (JP); Kenta Matsubara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 520 days.

(21) Appl. No.: 12/320,508

(22) Filed: Jan. 28, 2009

(65) Prior Publication Data
US 2009/0190932 A1 Jul. 30, 2009

(30) Foreign Application Priority Data

Jan. 30, 2008 (JP) ................................. 2008-019821
Jan. 30, 2008 (JP) ................................. 2008-019822
Jan. 30, 2008 (JP) ................................. 2008-019823

(51) Int. Cl.
*H04B 10/00* (2006.01)
(52) U.S. Cl. ........ 398/140; 398/151; 398/156; 398/162; 398/195; 398/209
(58) Field of Classification Search .................. 398/140, 398/151, 156, 162, 195
See application file for complete search history.

(56) References Cited

U.S. PATENT DOCUMENTS

| 2007/0036498 A1* | 2/2007 | Cianciotto | 385/115 |
| 2008/0232795 A1* | 9/2008 | Klar et al. | 398/13 |
| 2008/0291461 A1* | 11/2008 | Waagaard et al. | 356/478 |

FOREIGN PATENT DOCUMENTS

| JP | 3494683 | | 6/1995 |
| JP | 2001223645 | A | 8/2001 |
| JP | 2006074231 | A | 3/2006 |
| JP | A 2007-81134 | | 3/2007 |
| JP | 2007295050 | A | 11/2007 |

OTHER PUBLICATIONS

KDDI R&D Laboratories, "The Realization of Infrared Wireless Communication of 1 Gbit/s Transmission Speed Using a Mobile Telephone", online, searched Jan. 21, 2008, Internet, URL: http://www.kddilabs.jp/press/img/83_1.pdf.
Corresponding JPO Official communication dated Oct. 4, 2011.
Corresponding JPO Official communication dated Oct. 11, 2011.

* cited by examiner

*Primary Examiner* — Dung Nguyen
(74) *Attorney, Agent, or Firm* — SOLARIS Intellectual Property Group, PLLC

(57) ABSTRACT

An electronic device includes a casing having a laser light reception region on its outer surface, a receiver that receives transmission data from a partner device, and a suppression member that suppresses leakage of the laser light between the partner device and the electronic device. The partner device includes a laser light emission component and a laser light modulator. The receiver detects, in a state where the partner device and the electronic device are positioned in to communicable positions where the laser light from the partner device is made incident inside the light reception region of the electronic device, the laser light incident inside the light reception region and demodulates the transmission data from the laser light detection result. The suppression member is disposed in at least an area surrounding the light reception region.

13 Claims, 15 Drawing Sheets

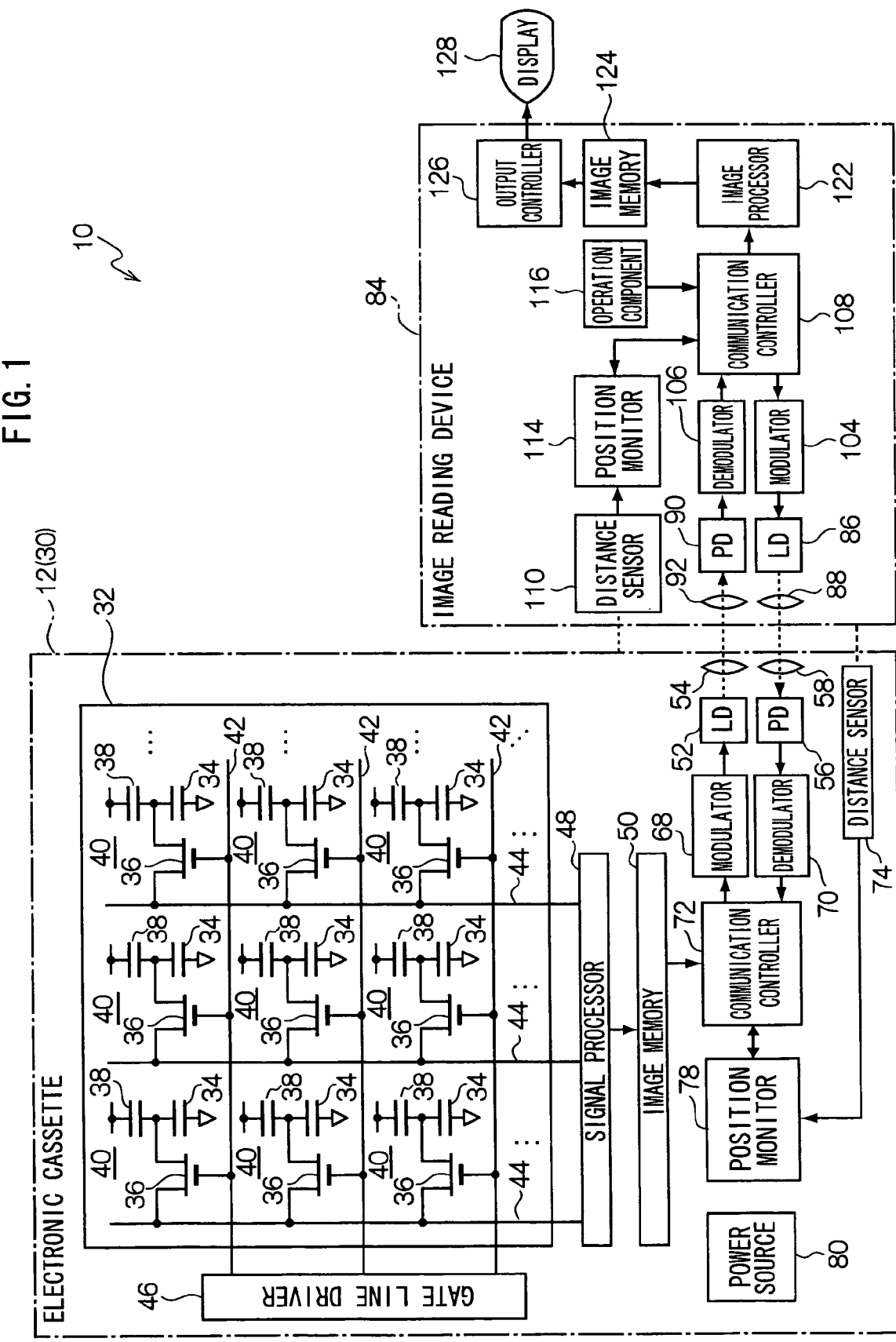

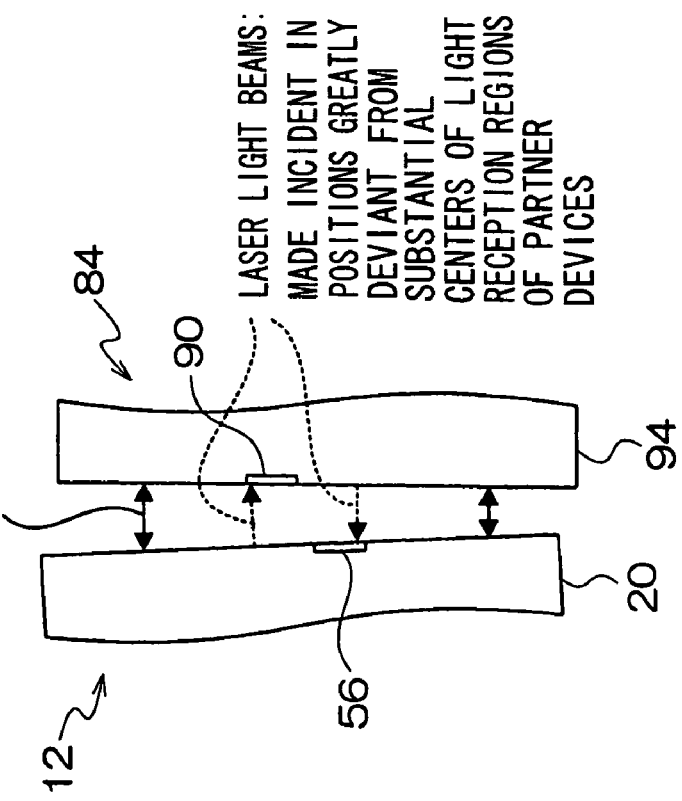

FIG. 7A
RELATIVE POSITIONS AT TIME OF DATA TRANSFER INITIATION

DISTANCE DETECTION VALUE L → REFERENCE VALUE Lref

LASER LIGHT BEAMS: MADE INCIDENT ON SUBSTANTIAL CENTERS OF LIGHT RECEPTION REGIONS OF PARTNER DEVICES

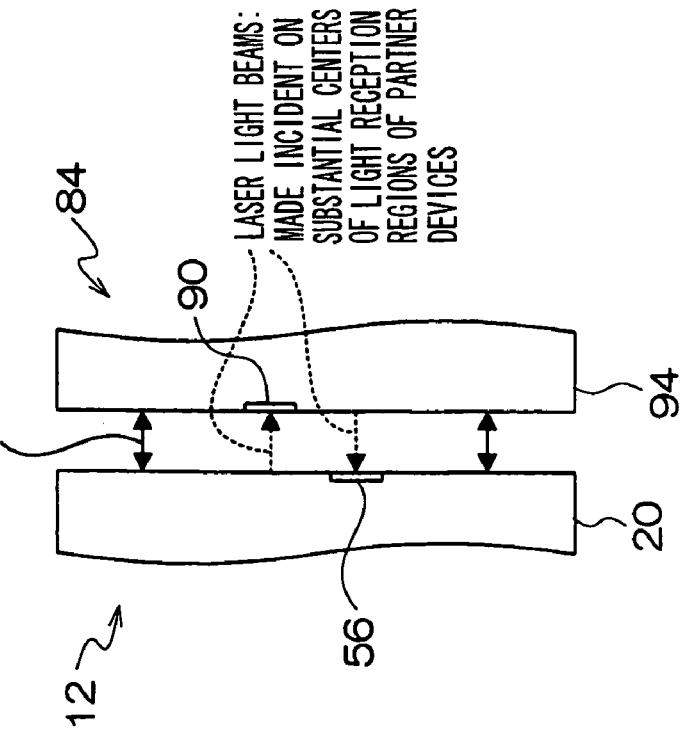

FIG. 7B
AT TIME OF CHANGE IN RELATIVE POSITIONS

DISTANCE DETECTION VALUE L ≥ Lref + α → TERMINATE COMMUNICATION

LASER LIGHT BEAMS: MADE INCIDENT IN POSITIONS GREATLY DEVIANT FROM SUBSTANTIAL CENTERS OF LIGHT RECEPTION REGIONS OF PARTNER DEVICES

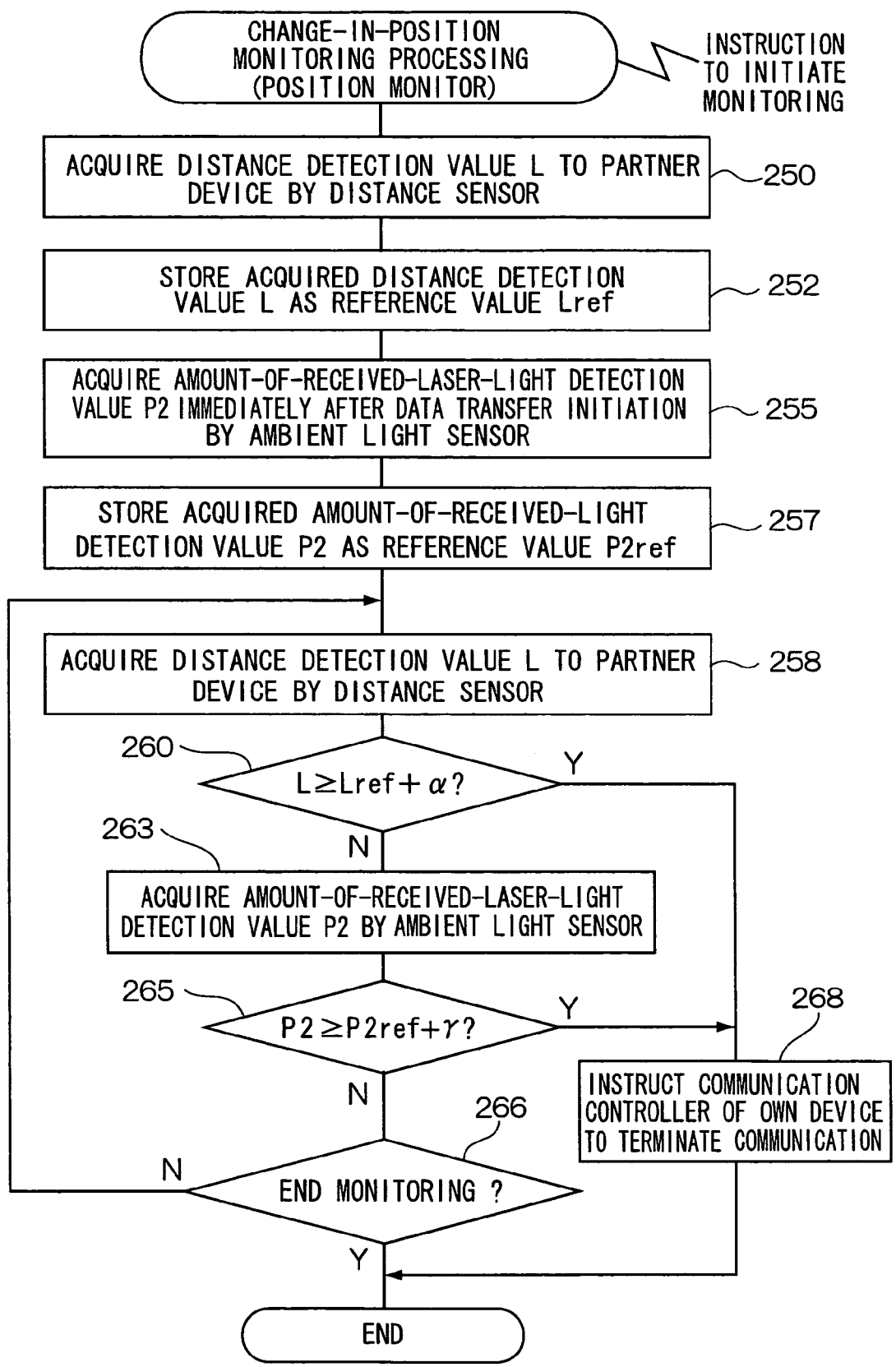

RELATIVE POSITIONS AT TIME OF DATA TRANSFER INITIATION

AT TIME OF CHANGE IN RELATIVE POSITIONS

20%: 80% REDUCTION PER 1 mm OF WAVELENGTH OF FILTER

ELECTRONIC DEVICE

CROSS-REFERENCE TO RELATED APPLICATIONS

This application claims priority under 35 USC 119 from Japanese Patent Applications Nos. 2008-019821, 2008-019822, and 2008-019823, the disclosures of which are incorporated by references herein.

BACKGROUND OF THE INVENTION

1. Field of the Invention

The present invention pertains to an electronic device and particularly relates to an electronic device that transmits information (data) to and receives information (data) from a partner device by laser light that has been modulated in accordance with transmission information (data).

2. Description of the Related Art

Recently, there has been proposed a technology that realizes wireless communication at an extremely high transmission speed (e.g., 1 Gb/s) using laser light in the wavelength region of infrared (e.g., see KDDI R&D Laboratories, "The Realization of Infrared Wireless Communication at a Transmission Speed of 1 Gbit/s Using a Mobile Telephone", online, searched Jan. 21, 2008, Internet, URL: http://www.kddilabs.jp/press/img/83_1.pdf). By using this technology, it becomes possible, in the transmission and reception of data between arbitrary electronic devices, to complete, when at least one of the electronic devices is portable and transmits and receives large quantities of data, the transmission and reception of large quantities of data in a short amount of time without having to interconnect, via a communication cable or the like, the electronic devices that transmit and receive data. For that reason, application of this technology to various purposes is expected, such as being able to realize a considerable reduction in communication time in wireless communication between existing devices and being able to realize, by wireless communication, the transmission and reception of large quantities of data between devices for which the transmission and reception of data by wireless communication had not conventionally been assumed.

For example, in Japanese Patent No. 3,494,683, there is disclosed a portable radiographic image converter (also called an "electronic cassette" below). This electronic cassette has a built-in radiation detector and a built-in image memory and is configured to store, in the image memory as image data, a radiographic image that is detected by the radiation detector, convert the image data read from the image memory into wireless signals, and output the wireless signals to an external signal processing circuit. In medical sites, there are numerous devices for which installation in an environment where radio waves are radiated is not desirable. Therefore, the wireless communication format suited for the above-described electronic cassette has conventionally been limited to infrared communication or the like that complies with the standards of the Infrared Data Association (IrDA). However, whereas communication speed is about 115 kb/s to 6 Mb/s in infrared communication that complies with the standards of the IrDA, in this type of medical device that handles radiographic images, lossless compression, where the compression rate is low when compressing image data, is selected in order to avoid radiogram interpretation from being adversely affected, so an extremely long time is required to transfer image data. For this reason, when the aforementioned communication by laser light is applied as the wireless communication format in the electronic cassette, a considerable reduction in the image data transfer time can be realized.

Relating to the above, as a technology that improves safety in a device that handles laser light, in Japanese Patent Application Laid-Open (JP-A) No. 2007-81134, there is disclosed an optical communication module of a configuration equipped with a laser diode disposed in a lead frame and a transparent resin component that serves as an adjustment component that performs laser diode light output distribution expansion and output adjustment. In this optical communication module, the transparent resin component is configured to include a transparent resin that seals the laser diode and a glass filler that is added to this transparent resin, is distributed substantially uniformly throughout all of the transparent resin and exhibits a light transmission and diffusion function.

In an aspect where electronic devices perform wireless communication using laser light, when at least one of the electronic devices is portable, wireless communication is performed in a state where both of the electronic devices are disposed in a positional relationship where wireless communication by laser light is possible. At this time, since at least one of the electronic devices is portable, when pressing force or vibration acts on the casing of the electronic device in the middle of communication by laser light, the relative positions of both of the electronic devices may change. In accompaniment with this change in the relative positions, there has been the potential for the laser light to leak out from the intervening space between both of the electronic devices.

Particularly when non-visible laser light is used in wireless communication, a user cannot see the laser light, and therefore, even if the laser light are leaking out, the user cannot recognize that the laser light is leaking out.

With respect thereto, the technology described in JP-A No. 2007-81134 is a technology that realizes an expansion of the light output distribution of the optical communication module and a drop in the light output amount of the optical communication module as a result of the light from the laser diode being repeatedly refracted by the glass filler. Consequently, the technology does not contribute in any way to preventing leakage of the laser light when the relative positions of the electronic devices during communication by laser light have changed.

SUMMARY OF THE INVENTION

The present invention has been made in consideration of the above-described circumstances and provides an electronic device that can suppress leakage of laser light from an intervening space between the electronic device and a partner device that serves as a communication target.

A first aspect of the invention is an electronic device including: a casing that includes, on its outer surface, a light reception region that receives laser light; a receiver that receives transmission data from a partner device equipped with an emission component that emits laser light and a modulator that modulates, in accordance with the transmission data, the laser light emitted from the emission component, the receiver detecting, in a state in which relative positions of a casing of the partner device and the casing of the electronic device are adjusted to communicable positions at which the laser light emitted from the partner device is incident within the light reception region of the casing of the electronic device, the laser light that is incident within the light reception region, and demodulating the transmission data from the detected laser light; and a suppression member disposed in at least an area surrounding the light reception region and suppressing leakage of the laser light from between the casing of the partner device and the casing of the electronic device.

BRIEF DESCRIPTION OF THE DRAWINGS

Exemplary embodiments of the present invention will be described in detail based on the following figures, wherein:

FIG. 1 is a block diagram showing the general configurations of an electronic cassette and an image reading device pertaining to a first exemplary embodiment;

FIG. 7A and FIG. 7B are conceptual diagrams for illustrating the sensing of a change in position based on a distance detection value;

FIG. 11 is a flowchart of change-in-position monitoring processing pertaining to the second exemplary embodiment;

DETAILED DESCRIPTION OF THE INVENTION

Below, exemplary embodiments of the present invention will be described in detail with reference to the drawings.

First Exemplary Embodiment

FIG. 1 shows a radiographic image handling system 10 pertaining to the present exemplary embodiment. The radiographic image handling system 10 is configured by an electronic cassette 12 and an image reading device 84. The electronic cassette 12 is portable and, each time the electronic cassette 12 is irradiated with radiation that carries image information, is capable of converting the image information into image data and storing the image data. The image reading device 84 is capable of reading the image data that is stored in the electronic cassette 12. The electronic cassette 12 and the image reading device 84 correspond to an electronic device pertaining to the present invention.

Figure 2A:
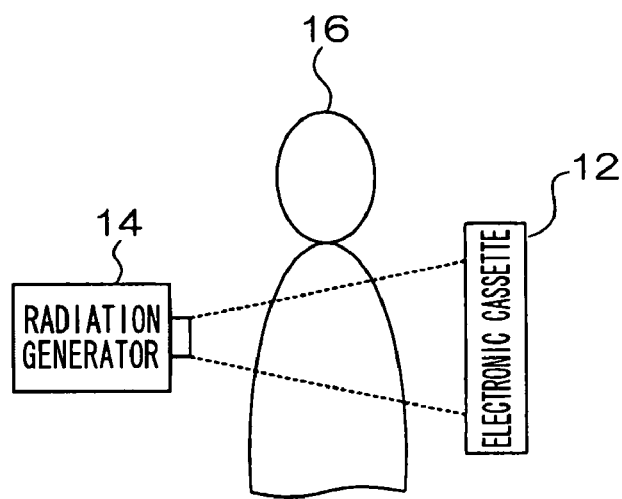
FIG. 2A is a general diagram showing the arrangement of the electronic cassette during radiographic image shooting.

As shown in FIG. 2A, the electronic cassette 12 is disposed a distance away from a radiation generator 14 that generates radiation such as X rays during shooting of a radiographic image. In this positional relationship, the space between the radiation generator 14 and the electronic cassette 12 is a shooting position for a subject 16 to be disposed. When shooting of a radiographic image is instructed, the radiation generator 14 emits radiation of a radiation amount that corresponds to a shooting condition given beforehand. The radiation emitted from the radiation generator 14 carries image information as a result of transmitting through the subject 16 positioned in the shooting position, and is thereafter irradiated on the electronic cassette 12.

Figure 2B:
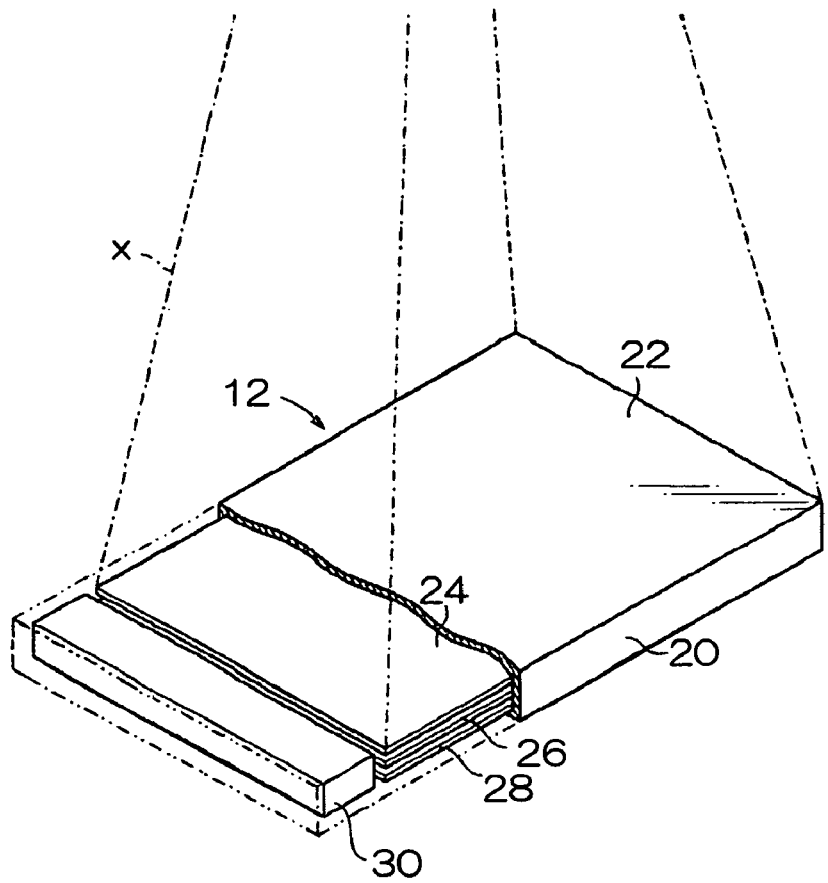
FIG. 2B is a perspective diagram showing the internal structure of the electronic cassette.

As shown in FIG. 2B, the electronic cassette 12 is covered by a tabular casing 20 having a certain thickness that contains a material that allows radiation X to be transmitted therethrough. Inside the casing 20, there are disposed, in order from an irradiated surface 22 side of the casing 20 that is irradiated with the radiation X, a grid 24 that removes scattered radiation of the radiation X that arises in accompaniment with the radiation X transmitting through the subject 16, a radiation detector (radiation detecting panel) 26 that detects the radiation X, and a lead plate 28 that absorbs back scattered radiation of the radiation X. Alternately, the irradiated surface 22 of the casing 20 may be configured by the grid 24. Further, a case 30 that houses various circuits (described later) including a microcomputer is disposed on one side of the interior of the casing 20. It is desirable to dispose a lead plate or the like on the side of the case 30 that is adjacent to the irradiated surface 22 in order to avoid the various circuits housed inside the case 30 to be damaged by being irradiated with the radiation X.

The radiation detector 26 of the electronic cassette 12 is configured by a photoelectric conversion layer that absorbs and converts radiation into electric charges being laminated on a TFT active matrix substrate 32 shown in FIG. 1. The photoelectric conversion layer is formed by, for example, non-crystalline a-Se (amorphous selenium) whose main component (e.g., having a content percentage equal to or greater than 50%) is selenium, and when the photoelectric conversion layer is irradiated with radiation, the photoelectric conversion layer converts the irradiated radiation into electric charges by generating, inside of itself, electric charges (electron-hole pairs) of charge amount corresponding to the radiation amount that is irradiated. Further, on the TFT active matrix substrate 32, numerous pixels 40 (in FIG. 1, the photoelectric conversion layer that corresponds to the individual pixels 40 is schematically shown as photoelectric converter 38) equipped with storage capacitors 34 that store the electric charges generated by the photoelectric conversion layer and TFTs 36 for reading the electric charges stored in the storage capacitors 34, are disposed in a matrix. The electric charges generated by the photoelectric conversion layer due to an irradiation of radiation onto the electronic cassette 12 are stored in the storage capacitors 34 of the individual pixels 40. Thus, the image information (data) that is carried in the radiation that was irradiated on cassette 12 is converted into electric charge information and is held in the radiation detector 26.

Further, on the TFT active matrix substrate 32, there are disposed plural gate lines 42, which extend in a constant direction (row direction) and are for switching ON and OFF the TFTs 36 of the individual pixels 40, and plural data lines 44, which extend in a direction (column direction) orthogonal to the gate lines 42 and are for reading the stored electric charges from the storage capacitors 34 via the TFTs 36 that are switched ON. The individual gate lines 42 are connected to a gate line driver 46, and the individual data lines 44 are connected to a signal processor 48. When the electric charges are stored in the storage capacitors 34 of the individual pixels 40, the TFTs 36 of the individual pixels 40 are switched ON in order in row units by signals supplied via the gate lines 42 from the gate line driver 46, and the electric charges stored in the storage capacitors 34 of the pixels 40 whose TFTs 36 are switched ON are transmitted through the data lines 44 as electric charge signals and are inputted to the signal processor 48. Consequently, the electric charges stored in the storage capacitors 34 of the individual pixels 40 are read in order in row units.

Although they are not shown, the signal processor 48 is equipped with amplifiers and sample/hold circuits that are disposed for each of the individual data lines 44. The electric charge signals transmitted through the individual data lines 44 are amplified by the amplifiers and thereafter held in the sample/hold circuits. Multiplexers and A/D converters are connected to output ends of the sample/hold circuits in this order. The electric charge signals held in the individual sample/hold circuits are inputted in order (serially) to the multiplexers and are converted into digital image data by the A/D converters. An image memory 50 is connected to the signal processor 48, and the image data outputted from the A/D converters of the signal processor 48 are stored sequentially in the image memory 50. The image memory 50 has a memory capacity that is capable of storing image data of plural frames, and each time shooting of a radiographic image is performed, the image data obtained by shooting are sequentially stored in the image memory 50.

Figure 3A:
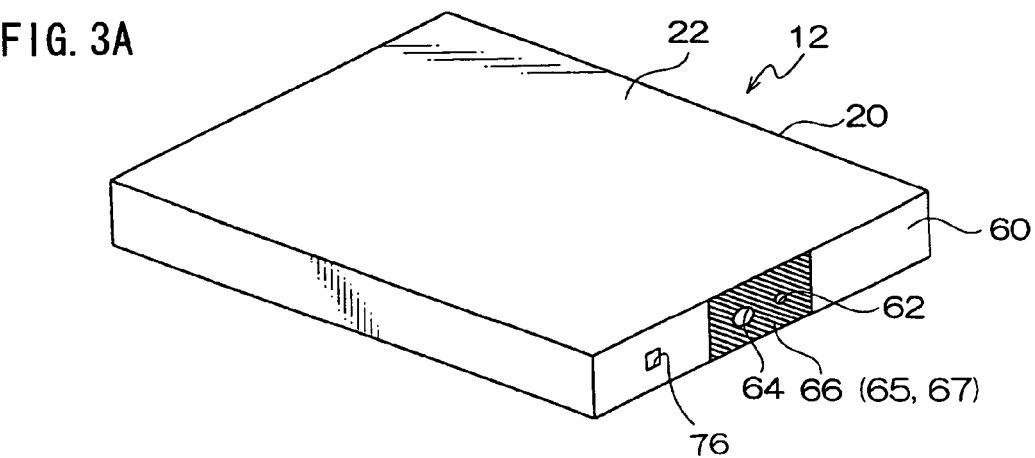
FIG. 3A is a perspective diagram showing the appearance of the electronic cassette.

The electronic cassette 12 has a function of performing wireless communication by laser light with the image reading device 84, and the electronic cassette 12 is equipped with a laser diode (LD) 52 that serves as a laser light source and a photo diode (PD) 56 that detects laser light that is made incident from the outside. In order to speed up communication between the electronic cassette 12 and the image reading device 84, the LD 52 may be an LD that emits laser light with a wavelength (e.g., 1.3 μm) in the infrared region, and the PD 56 may be a PD that is sensitive to wavelengths in the infrared region. In the exemplary embodiment, as shown in FIG. 3A, an emission hole 62 for the laser light emitted from the LD 52 to pass through and a light reception hole 64 for laser light from the outside (e.g., the image reading device 84) to pass through are respectively disposed in a specific side surface 60 (this side surface is disposed so as to oppose a casing of the image reading device 84 during communication with the image reading device 84, and therefore, hereinafter this side surface will be called "the opposing surface 60") of the casing 20 of the electronic cassette 12. In FIG. 3A, a side surface that borders a short side of the irradiated surface 22 is used as the opposing surface 60 in which the emission hole 22 and the light reception hole 64 are disposed. However, the exemplary embodiment is not limited to this, and the opposing surface 60 may be a side surface that borders a long side of the irradiated surface 22 or may be the bottom surface (the surface on the opposite side of the irradiated surface 22) or the like.

The laser light emitted from the LD 52 transmits through a lens 54 (see FIG. 1) disposed on a laser light emission side of the LD 52, passes through the emission hole 62 and exits to the outside of the casing 20. Laser light from the outside passes through the light reception hole 64, transmits through a lens 58 (see FIG. 1) disposed on a light incident side of the PD 56 and is received by the PD 56. Further, a partial region, including an area surrounding the light reception hole 64 (and the emission hole 62), of the opposing surface 60 of the casing 20 of the electronic cassette 12 is covered by a diffusion member 66 that is capable of diffusing reflection light of the irradiated laser light by reflecting the irradiated laser light in mutually different plural directions.

The partial region can be disposed so as to surround the light reception hole 64 and the emission hole 62 in the opposing surface 60. Further, the partial region may include a range of the opposing surface 60 where it is predicted that a displacement in the laser light will occur when a user disposes the electronic cassette 12 and the image reading device 84 face-to-face in order to read the image data from the electronic cassette 12. Moreover, the entire opposing surface 60 may be covered by the diffusion member 66.

As the diffusion member 66, there can, for example, be used a member whose surface shaped such that plural portions whose reflection directions of irradiated light are mutually different are present within a minute region having an area equal to or less than that of an irradiated region when irradiated with the laser light emitted from the image reading device 84. Thus, the diffusion member 66 can reliably diffuse the reflection light of the irradiated laser light. Further, as the diffusion member 66, there can, for example, be used a member whose surface is formed in a skin embossed or a pear coat (dull) finish, whose surface roughness Ra is equal to or less than about $\frac{1}{10}$ of the wavelength of the laser light irradiated onto the diffusion member 66, and whose surface is shaped such that hemispherical convexes are distributed uniformly on the surface. Incident angle dependence of the surface of the diffusion member 66 can be reduced by giving the individual convexes hemispherical shapes as described above, and by making the size of the individual convexes equal to or less than about $\frac{1}{10}$ of the wavelength of the laser light, the surface becomes a region of Rayleigh scattering and the irradiated laser light with can be scattered more remarkably.

The LD 52 is connected to a communication controller 72 via a modulator 68. The communication controller 72 is realized by a microcomputer and, when transmitting data to the image reading device 84, outputs the transmission data to the modulator 68 and instructs the modulator 68 about the intensity of the laser light to be emitted from the LD 52. The modulator 68 modulates, in accordance with the inputted transmission data and in a predetermined modulation format, the laser light emitted from the LD 52 and controls the driving of the LD 52 such that the intensity of the laser light emitted from the LD 52 matches the instructed intensity. Thus, laser light modulated in accordance with the transmission data is emitted from the LD 52 in the intensity that has been instructed by the communication controller 72.

The PD 56 is connected to the communication controller 72 via a demodulator 70. When laser light from the outside is received by the PD 56 and a received-light amount signal corresponding to the amount of the received laser light is inputted from the PD 56, the demodulator 70 demodulates, in a predetermined demodulation format, the data that the received laser light carries (i.e., data transmitted from a communication partner device) on the basis of the inputted received-light amount signal and outputs the demodulated data to the communication controller 72. The demodulator 70 also simultaneously senses the amount of laser light received by the PD 56 and also outputs the sensing result of the amount of received laser light to the communication controller 72. The communication controller 72 performs data transfer processing (FIG. 5) which will be described later.

A distance sensor 74 is disposed in the electronic cassette 12. In the exemplary embodiment, the distance sensor 74 is equipped with a light emitting element and a light receiving element, measures the amount of time from when light is emitted by the light emitting element to until the emitted light is reflected by a target object and is received by the light receiving element, and detects the distance to the target object on the basis of the measured amount of time. As shown in FIG. 3A, a detection hole 76 is disposed in the opposing surface 60 of the casing 20 of the electronic cassette 12. The light emitted from the light emitting element of the distance sensor 74 passes through the detection hole 76, a target object that is present in front of the opposing surface 60 is irradiated with that light, and the light reflected by the target object passes through the detection hole 76 and is received by the light receiving element.

The communication controller 72 and the distance sensor 74 are connected to a position (change-in-position) monitor 78. The position monitor 78 is also realized by a microcomputer. During communication between the electronic cassette 12 and the image reading device 84, the position monitor 78 performs change-in-position monitoring processing (FIG. 6, details thereof will be described later) to monitor a change in the relative positions of the electronic cassette 12 and the image reading device 84 by monitoring the amount of received laser light that has been sensed by the demodulator 70 and a change in the distance that has been detected by the distance sensor 74.

A power source component 80 is disposed in the electronic cassette 12, and the aforementioned various circuits and elements (the gate line driver 46, the signal processor 48, the image memory 50, the microcomputers that function as the communication controller 72 and the position monitor 78, the modulator 68, the LD 52, the PD 56, the demodulator 70, the distance sensor 74, etc.) are actuated by electrical power supplied from the power source component 80. As the power source component 80, a built-in battery (a rechargeable secondary battery) can be employed to supply electrical power to the various circuits and elements so as to not hinder the portability of the electronic cassette 12. Alternatively, a primary battery may be used as the battery, or there may be used a configuration that is constantly connected to a commercial power source, rectifies and transforms electrical power supplied from the commercial power source to supply the electrical power to the various circuits and elements.

Figure 3B:
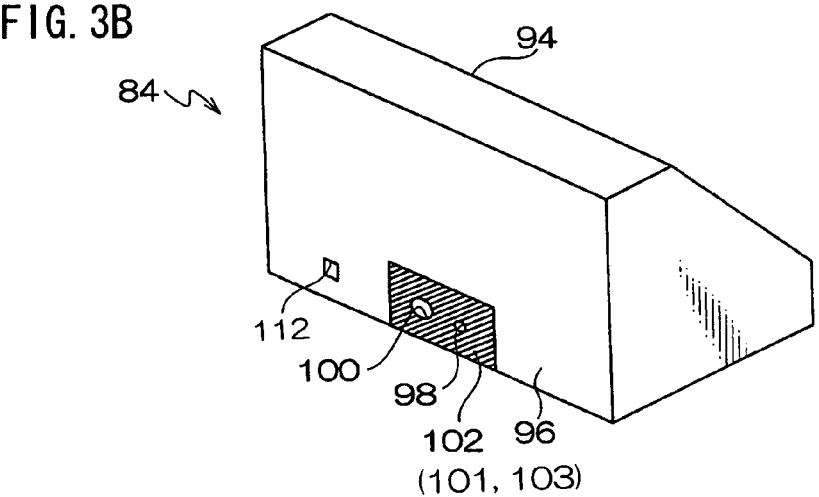
FIG. 3B is a perspective diagram showing the appearance of the image reading device.

The image reading device 84 also has a function of performing wireless communication by laser light with the electronic cassette 12, and the image reading device 84 is equipped with an LD 86 that serves as a laser light source and a PD 90 that detects laser light that is made incident from the outside. In order to speed up communication between the electronic cassette 12 and the image reading device 84, similar to the electronic cassette 12, the LD 86 may be an LD that emits laser light with a wavelength in the infrared region, and the PD 90 may be a PD that is sensitive to wavelengths in the infrared region. In the exemplary embodiment, as shown in FIG. 3B, an emission hole 98 for the laser light emitted from the LD 86 to pass through and a light reception hole 100 for laser light from the outside (e.g., the electronic cassette 12) to pass through are respectively disposed in a specific side surface 96 (this side surface is disposed so as to oppose the casing 20 of the electronic cassette 12 during communication with the electronic cassette 12, and therefore, hereinafter this side surface will be called "the opposing surface 96") of a casing 94 that covers the image reading device 84.

The distance between the emission hole 98 and the light reception hole 100 disposed in the opposing surface 96 and the height of the emission hole 98 and the light reception hole 100 from the bottom surface of the casing 94 are set to be respectively equal to the distance between the emission hole 62 and the light reception hole 64 disposed in the opposing surface 60 of the casing 20 of the electronic cassette 12 and the height of the emission hole 62 and the light reception hole 64 from the bottom surface of the casing 20. That is, the emission hole 98 and the light reception hole 100 are disposed such that, in a state where the opposing surface 60 of the electronic cassette 12 and the opposing surface 94 of the image reading device 84 are disposed face-to-face (the state shown in FIG. 3C), the light reception hole 100 faces the emission hole 62 and the emission hole 98 faces the light reception hole 64.

The laser light emitted from the LD 86 transmits through a lens 88 (see FIG. 1) disposed on a laser light emission side of the LD 86, passes through the emission hole 98 and exits to the outside of the casing 94. Laser light from the outside passes through the light reception hole 100, transmits through a lens 92 (see FIG. 1) disposed on a light incident side of the PD 90 and is received by the PD 90. Further, a partial region, including the area surrounding the light reception hole 100 (and the emission hole 98), of the opposing surface 96 of the casing 94 of the image reading device 84 is covered by a diffusion member 102 in the same manner as the electronic cassette 12.

The LD 86 is connected to a communication controller 108 via a modulator 104. The communication controller 108 is realized by a microcomputer and, when transmitting data to the electronic cassette 12, outputs the transmission data to the modulator 104 and instructs the modulator 104 about the intensity of the laser light to be emitted from the LD 86. The modulator 104 modulates, in accordance with the inputted transmission data and in a predetermined modulation format, the laser light emitted from the LD 86 and controls the driving of the LD 86 such that the intensity of the laser light emitted from the LD 86 matches the instructed intensity. Thus, laser light modulated in accordance with the transmission data is emitted from the LD 86 in the intensity that has been instructed by the communication controller 108.

The PD 90 is connected to the communication controller 108 via a demodulator 106. When laser light from the outside is received by the PD 90 and a received-light amount signal corresponding to the amount of the received laser light is inputted from the PD 90, the demodulator 106 demodulates, in a predetermined demodulation format, the data that the received laser light carries (i.e., data transmitted from a communication partner device) on the basis of the inputted received-light amount signal and outputs the demodulated data to the communication controller 108. The demodulator 106 also simultaneously senses the amount of laser light received by the PD 90 and outputs the sensing result of the amount of received laser light to the communication controller 108. The communication controller 108 performs data reading processing (FIG. 4A and FIG. 4B) which is described later.

A distance sensor 110 is also disposed in the image reading device 84. In the exemplary embodiment, the distance sensor 110 detects, in the same manner as the aforementioned distance sensor 74, the distance to a target object on the basis of the amount of time until light emitted from a light emitting element is reflected by the target object and received by a light receiving element. As shown in FIG. 3B, a detection hole 112 is also disposed in the opposing surface 96 of the casing 94 of the image reading device 84. The light emitted from the light emitting element of the distance sensor 110 passes through the detection hole 112, a target object that is present in front of the opposing surface 96 is irradiated with that light, and the light reflected by the target object passes through the detection hole 112 and is received by the light receiving element.

The communication controller 108 and the distance sensor 110 are connected to a position monitor 114. The position monitor 114 is also realized by a microcomputer. The position monitor 114 performs, as well as the position monitor 78 of the electronic cassette 12, the change-in-position monitoring processing (FIG. 6, details thereof will be described later).

Figure 3C:
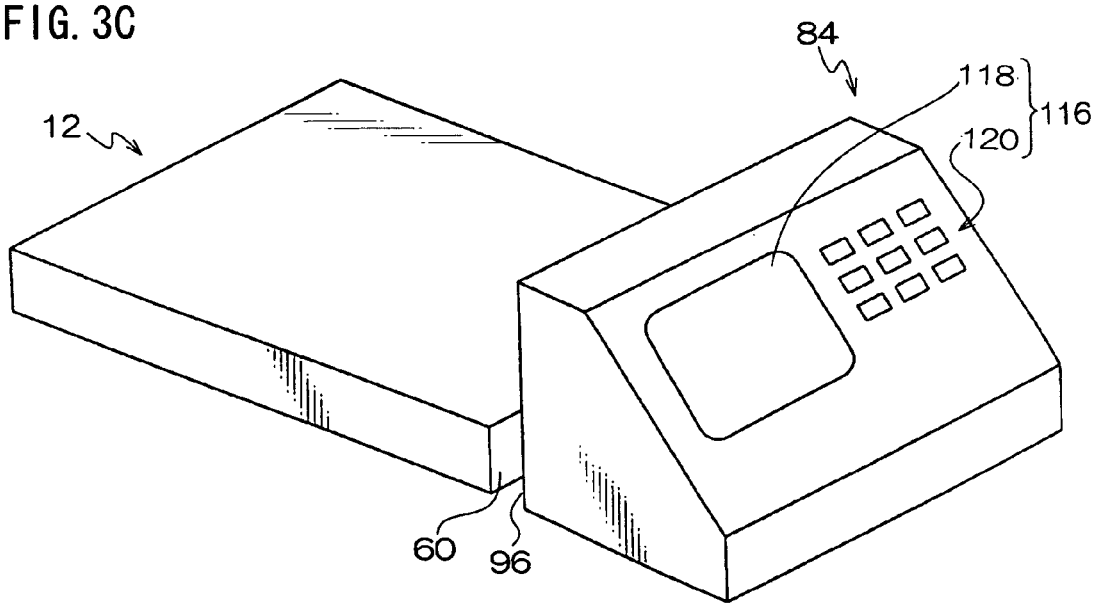
FIG. 3C is a perspective diagram showing the arrangement of the electronic cassette and the image reading device during image reading from the electronic cassette.

An operation component 116 is connected to the communication controller 108. The operation component 116 includes, as shown in FIG. 3C, a display 118 disposed in the casing 94 and can display arbitrary information including various messages, and a keyboard 120 also disposed in the casing 94 and equipped with plural keys. Various instructions and information are inputted to the communication controller 108 as a result of a user operating the keyboard 120. Display of the information on the display 118 is controlled by the communication controller 108.

An image memory 124 is connected via an image processor 122 to the communication controller 108. In communication between the electronic cassette 12 and the image reading device 84, image data stored in the image memory 50 of the electronic cassette 12 are transferred to the image reading device 84. The image processor 122 performs various types of image processing with respect to the image data that are received from the electronic cassette 12 and sequentially outputted from the communication controller 108 and stores, in the image memory 124, the image data on which the various types of image processing have been performed. Included in the various types of image processing are various types of correction processing such as removing noise superposed on the image data, correcting variations per pixel of the image data resulting from variations in the characteristics of each of the pixels 40 of the radiation detector 26, and the like.

An output controller 126 is connected to the image memory 124. The output controller 126 controls, when outputting to an external device the image data stored in the image memory 124, the reading of the image data from the image memory 124 and the output of the image data to the external device. In FIG. 1, a display 128 is shown which serves as a typical example of the external device. When the external device is the display 128, an image (radiographic image) represented by the image data stored in the image memory 124 is displayed on the display 128 by the output controller 126. Examples of the external device other than the display 128 may include a printer that prints images represented by image data on a sheet-like printing medium, an information recording apparatus that records image data in a CD-R or other known information recording medium, and a communication device that transmits image data to an information processing device to which the communication device is connected via a communication network.

In FIG. 1, although illustration of a power source component of the image reading device 84 is omitted, the power source component is configured to be constantly connected to a commercial power source, rectify and transform electrical power supplied from the commercial power source, and supply the electrical power to the various circuits and elements inside the image reading device 84.

Next, communication between the electronic cassette 12 and the image reading device 84 will be described as an operation of the first exemplary embodiment. When a user desires to utilize image data (display the image data as an image on the display 128) stored in the image memory 50 of the electronic cassette 12 as a result of a shooting of a radiographic image, the user disposes the electronic cassette 12 such that the opposing surface 60 faces the opposing surface 94 of the image reading device 84 (the state shown in FIG. 3C) in order to read the image data from the electronic cassette 12 by the image reading device 84. The user performs minute adjustment of the disposed positions, such as aligning the respective tip ends of the opposing surface 60 and the opposing surface 94, and thereafter operates the keyboard 120 of the image reading device 84 to instruct reading of the image data from the electronic cassette 12.

Figure 4A:
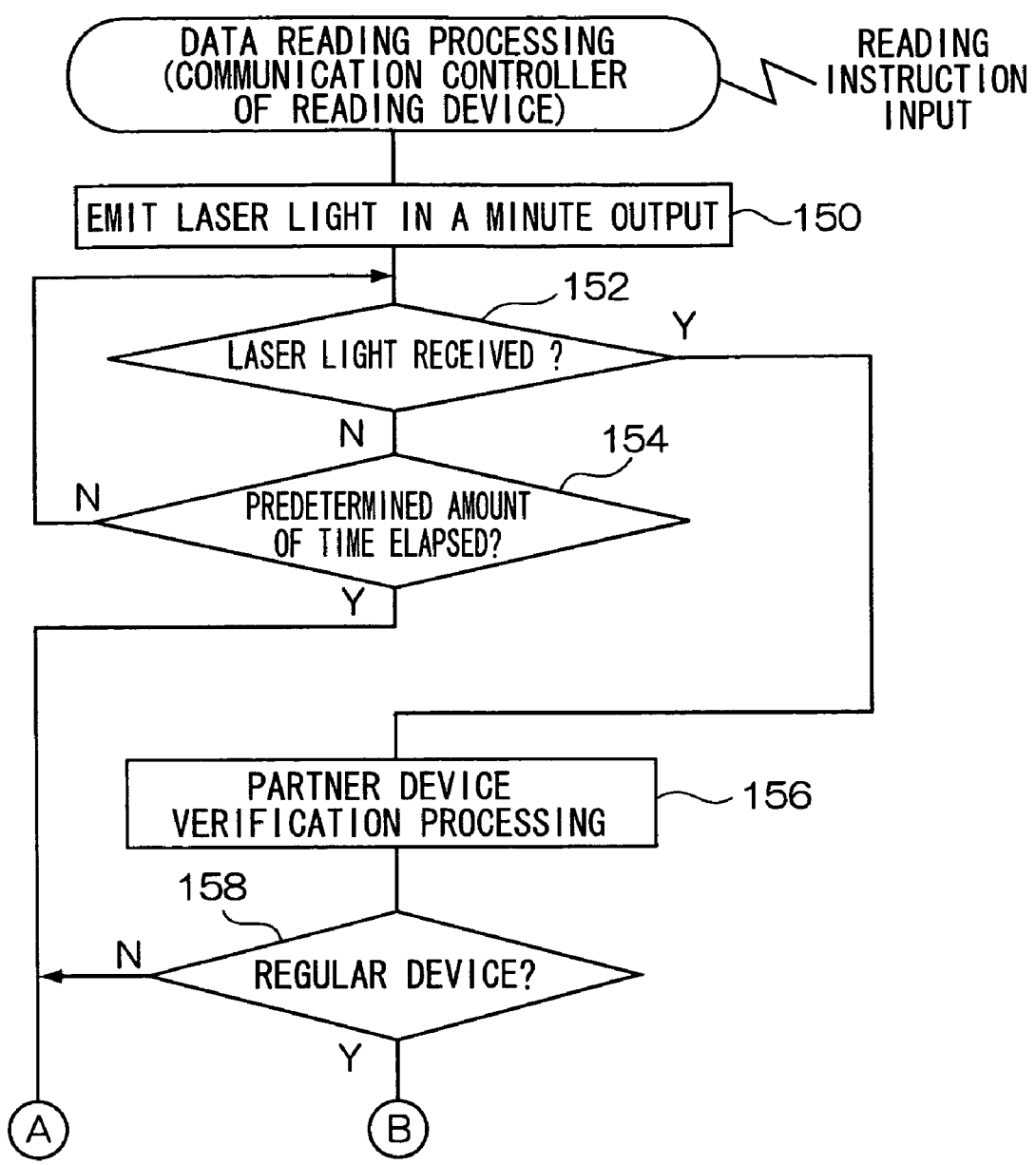
FIG. 4A and FIG. 4B are flowcharts of data reading processing.
Figure 4B:
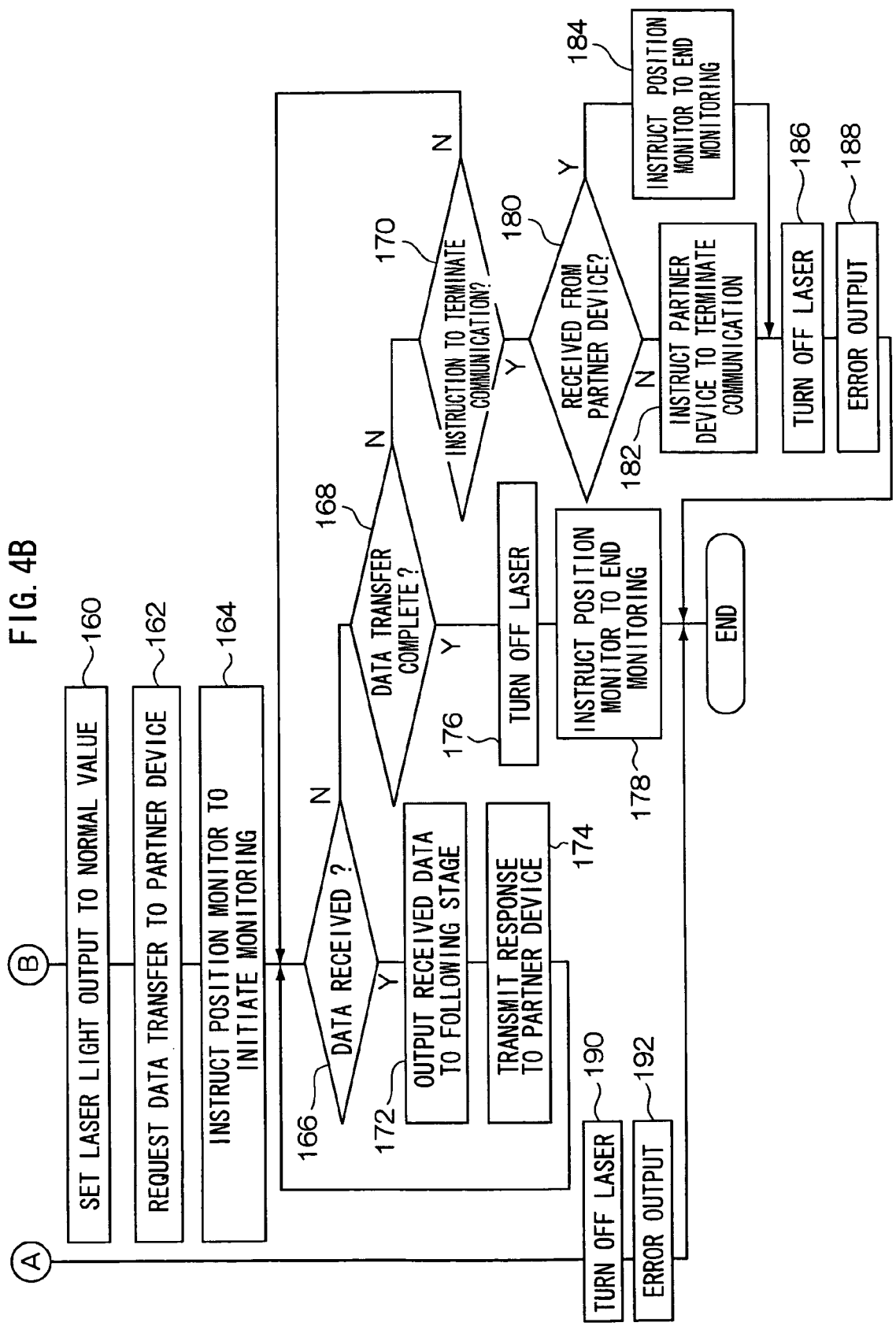

When the above-described operation is performed by the user and reading of the image data from the electronic cassette 12 is instructed, the communication controller 108 of the image reading device 84 performs the data reading processing shown in FIGS. 4A and 4B. Firstly in this data reading processing, in step 150, the communication controller 108 causes, via the modulator 104, the LD 86 to emit a minute output of laser light. In step 152, the communication controller 108 determines whether or not laser light is received by the PD 90. When the determination is negative, the processing to step 154 and determines whether or not a predetermined amount of time has elapsed after initiating emission of laser light from the LD 86. When this determination is also negative, the processing returns to step 152 and repeats steps 152 and 154 until either of the determinations becomes affirmative.

The minute output of laser light emitted from the LD 86 passes through the emission hole 98 and exits to the outside of the casing 94 of the image reading device 84. When this laser light passes through the light reception hole 64, is made incident inside the casing 20 of the electronic cassette 12 and is detected (sensed) by the PD 56, a minute output of laser light is, as described later, also emitted from the LD 52 of the electronic cassette 12, and this laser light is received by the PD 90. Consequently, when the determination in step 154 is affirmative because laser light is not received by the PD 90 even when the predetermined amount of time has elapsed after initiating emission of the laser light from the LD 86, it can be judged that the relative positions of the electronic cassette 12 and the image reading device 84 have shifted from a communicable positional relationship (positions where the electronic cassette 12 and the image reading device 84 can each receive laser light emitted from the partner device) and that adjustment of the relative positions is necessary.

For this reason, when the determination in step 154 is affirmative, in step 190, the communication controller 108 causes the LD 86 to stop emission of the laser light, and in step 192, the communication controller 108 prompts the user to adjust the relative positions by displaying on the display 118 an error message requesting adjustment of the relative positions and thereafter ends the data reading processing (FIG. 4B). When the relative positions of the electronic cassette 12 and the image reading device 84 are shifted greatly from the communicable positional relationship, there is the potential for the laser light emitted from the image reading device 84 to leak out from the intervening space between the opposing surface 60 of the electronic cassette 12 and the opposing surface 96 of the image reading device 84. However, because the light amount (light intensity) of the laser light being emitted from the LD 86 of the image reading device 84 at this time is minute, a problem does not arise.

Figure 5:
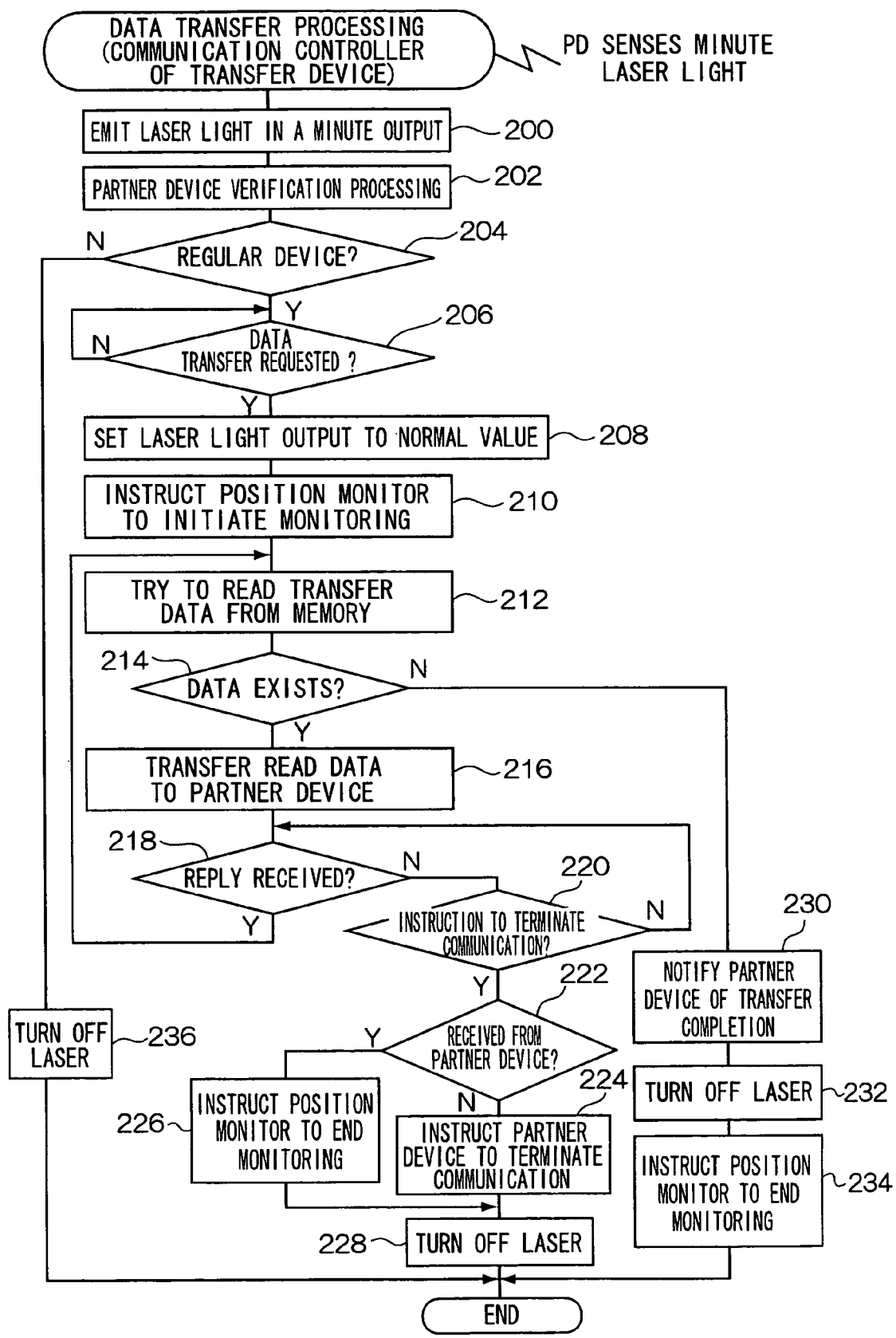
FIG. 5 is a flowchart of data transfer processing.

When the relative positions of the electronic cassette 12 and the image reading device 84 are in the communicable positional relationship and the minute output of laser light emitted from the image reading device 84 is received (sensed) by the PD 56 of the electronic cassette 12, this detection of the laser light by the PD 56 triggers the communication controller 72 of the electronic cassette 12 to perform the data transfer processing shown in FIG. 5. In this data transfer processing, first, in step 200, the communication controller 72 causes a minute output of laser light to be emitted from the LD 52 via the modulator 68. The minute output of laser light emitted from the LD 52 passes through the emission hole 62 and exits to the outside of the casing 20 of the electronic cassette 12. When this laser light passes through the light reception hole 100, is made incident inside the casing 94 of the image reading device 84 and is detected (sensed) by the PD 90, the determination in step 152 of the data reading processing (FIG. 4A) becomes affirmative and the processing moves to step 156.

When the determination in step 152 of FIG. 4A is affirmative, the minute amount of laser light emitted from the LD 86 of the image reading device 84 is detected (sensed) by the PD 56 of the electronic cassette 12 and the minute output of laser light emitted from the LD 52 of the electronic cassette 12 is detected (sensed) by the PD 90 of the image reading apparatus 84. For that reason, it can be judged that the relative positions of the electronic cassette 12 and the image reading device 84 are in the communicable, appropriate positional relationship where the laser light emitted from the LD 86 is made incident in the center, or in the vicinity of the center, of the light receiving surface of the PD 56 and where the laser light emitted from the LD 52 is also made incident in the center, or in the vicinity of the center, of the light receiving surface of the PD 90.

Next, in step 156 of the data reading processing (FIG. 4A) and step 202 of the data transfer processing (FIG. 5), each of the communication controllers performs partner device verification processing to verify whether or not the partner device is a regular device by transmitting predetermined data by laser light from its own device (modulating, in accordance with predetermined data, the laser light emitted from the LD of its own device) and verifying the content of data received by laser light from the partner device (data obtained by demodulating the laser light emitted from the LD of the partner device and received by the PD of its own device). Examples of the data that the electronic cassette 12 transmits to the image reading device 84 in the partner device verification processing may include data such as a cassette ID for identifying the individual electronic cassettes 12. Examples of the data that the image reading device 84 transmits to the electronic cassette 12 may include data indicating that the image reading device 84 is an image reading device.

In step 158 of the data reading processing (FIG. 4A), the communication controller 108 determines whether or not the partner device is a regular device. When this determination is negative, in step 190, the communication controller 108 causes the LD 86 to stop emission of the laser light, and in the next step 192, the communication controller 108 performs error processing, such as displaying on the display 118 an error message notifying the user that the partner device is not a regular device, and ends the data reading processing (FIG. 4B). Further, also in the data transfer processing (FIG. 5), in step 204, the communication controller 72 determines whether or not the partner device is a regular device. When this determination is negative, in step 236, the communication controller 72 causes the LD 52 to stop emission of the laser light and ends the data transfer processing (FIG. 5).

Figure 6:
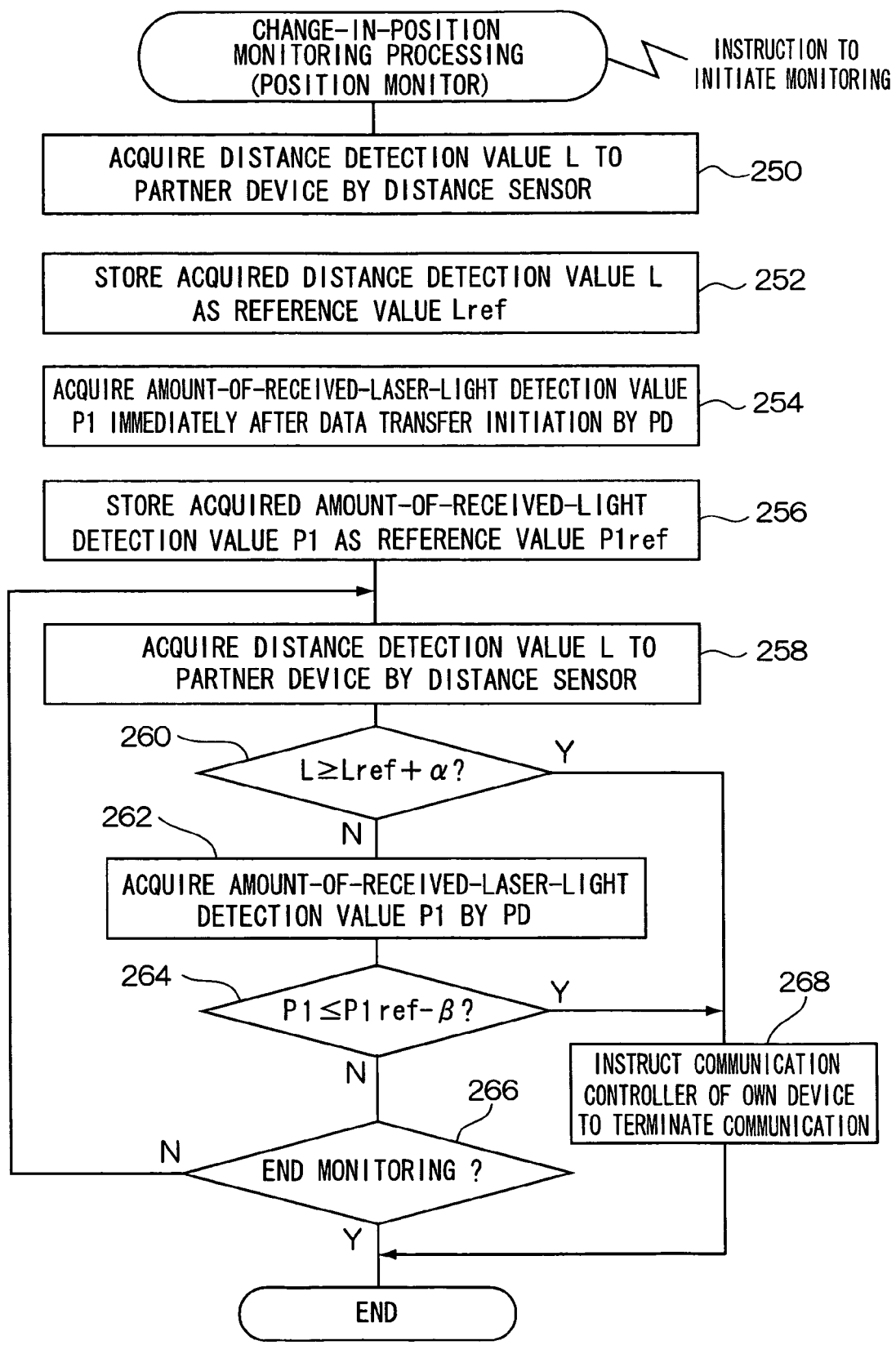
FIG. 6 is a flowchart of change-in-position monitoring processing pertaining to the first exemplary embodiment.

In the data reading processing (FIG. 4A), when the communication controller 108 judged that the partner device is a regular device (the electronic cassette 12), the determination in step 158 becomes affirmative, and the communication controller 108 moves to step 160 and sets the laser light output from the LD 86 to a value for normal communication. In step 162, the communication controller 108 transmits to the partner device by laser light a data transfer request. In step 164, the communication controller 108 instructs the position monitor 114 to initiate execution of the change-in-position monitoring processing (FIG. 6). This change-in-position monitoring processing will be described later. In step 166, the communication controller 108 determines whether or not data transferred from the partner device is received. When the determination is negative, the processing moves to step 168 and determines whether or not it has been notified by the partner device of the completion of data transfer. When this determination is also negative, the processing moves to step 170 and determines whether or not it is instructed by the position monitor 114 to terminate communication with the partner device. When this determination is also negative, the processing returns to step 166 and repeats step 166 to step 170 until any of the determinations becomes affirmative.

In the data transfer processing (FIG. 5), when the communication controller 72 judged that the partner device is a regular device (the image reading device 84), the determination in step 204 is affirmative, and the processing moves to step 206, determines whether or not it received a data transfer request from the partner device, and repeats step 206 until the determination becomes affirmative. When the communication controller 72 receives a data transfer request as a result of the processing of step 162 in FIG. 4B being performed in the image reading device 84, the determination in step 206 becomes affirmative, and the processing moves to step 208 and sets the laser light output from the LD 52 to a value for normal communication. In step 210, the communication controller 72 instructs the position monitor 78 to initiate execution of the change-in-position monitoring processing (FIG. 6). In step 212, the communication controller 72 tries reading, from the image memory 50, target image data to be transferred to the image reading device 84.

In step 214, the communication controller 72 determines whether or not transfer target image data (image data not yet transferred to the image reading device 84) is stored in the image memory 50. When the determination is affirmative, the processing moves to step 216 and transfers to the partner device (the image reading device 84) by laser light the transfer target image data successfully read from the image memory 50. In step 218, the communication controller 72 determines whether or not it received a reply from the image reading device 84. When this determination is negative, the processing moves to step 220 and determines whether or not it is instructed by the position monitor 78 to terminate communication with the partner device. When this determination is also negative, the processing returns to step 218 and repeats steps 218 and 220 until either of the determinations becomes affirmative.

As described above, when image data are transmitted by laser light from the electronic cassette 12 and the image data are received by the image reading device 84, the determination in step 166 of the data reading processing (FIG. 4B) is affirmative and the processing moves to step 172. In step 172, the communication controller 108 outputs the image data received from the partner device (the electronic cassette 12) to a device of a following stage (in the exemplary embodiment, the image processor 122). Thus, various types of image processing may be performed by the image processor 122 on the image data received by the image reading device 84, and thereafter the image data may be stored in the image memory 124. In step 174, the communication controller 108 transmits by laser light a reply (acknowledgement) with respect to the data transmission of the partner device (the electronic cassette 12) and the processing returns to step 166. When this reply is received by the partner device (the electronic cassette 12), the determination in step 218 of the data transfer processing (FIG. 5) becomes affirmative, and the processing returns to step 212. In this manner, as long as the transfer target image data being stored in the image memory 50 of the electronic cassette 12, step 166 to step 174 are repeated in the data reading processing (FIG. 4B) and step 212 to step 218 are repeated in the data transfer processing (FIG. 5), whereby the transfer of image data to the image reading device 84 is continued.

When the electronic cassette 12 transmits to the image reading device 84 all of the image data stored in the image memory 50, the determination in step 214 of the data transfer processing (FIG. 5) becomes negative, and the processing moves to step 230 and notifies the partner device (the image reading device 84) by laser light of the completion of data transfer. In step 232, the communication controller 72 causes the LD 52 to stop emission of the laser light. In step 234, the communication controller 72 instructs the position monitor 78 to terminate the change-in-position monitoring processing (FIG. 6) and ends the data transfer processing (FIG. 5). Further, when the image reading device 84 is notified by the electronic cassette 12 of the completion of data transfer, the determination in step 168 in the data reading processing (FIG. 4B) becomes affirmative, and the processing moves to step 176 to causes the LD 86 to stop emission of the laser light. In step 178, the communication controller 108 instructs the position monitor 114 to terminate the change-in-position monitoring processing (FIG. 6) and ends the data reading processing.

Next, the change-in-position monitoring processing executed by each of the position monitor 78 of the electronic cassette 12 and the position monitor 114 of the image reading device 84 will be described. Communication between the electronic cassette 12 and the image reading device 84 is, as has been previously described, initiated in a state where the relative positions of the electronic cassette 12 and the image reading device 84 are adjusted to the communicable positional relationship (the state shown in FIG. 3C). However, when, for example, pressing force or vibration acts on at least one of the casing 20 of the electronic cassette 12 and the casing 94 of the image reading device 84, there is the potential for the relative positions to shift from the communicable positional relationship in the middle of communication. In this case, there is the potential for the laser light emitted from the electronic cassette 12 or the image reading device 84 to leak out from the intervening space between the opposing surface 60 of the electronic cassette 12 and the opposing surface 96 of the image reading device 84. For this reason, the position monitors 78 and 114 initiate execution of the change-in-position monitoring processing by an instruction from the communication controllers of their own devices when communication between the electronic cassette 12 and the image reading device 84 is initiated. While communication between the electronic cassette 12 and the image reading device 84 is being performed, the position monitors 78 and 114 monitor a change in the relative positions of the electronic cassette 12 and the image reading device 84 by continuing execution of the change-in-position monitoring processing.

That is, as shown in FIG. 6, in the change-in-position monitoring processing, first, in step 250, the position monitor acquires, from the distance sensor, the current distance (distance detection value L) to the partner device that has been detected by the distance sensor provided in its own device. This step is performed at a time immediately after the relative positions of the electronic cassette 12 and the image reading device 84 are adjusted to the communicable positional relationship. Therefore, the distance detection value L acquired in step 250 represents the distance to the casing of the partner device in the disposed position of the distance sensor in a state where the relative positions of the electronic device 12 and the image reading sensor 84 are adjusted to the communicable positional relationship. In step 252, the position monitor stores, in a built-in memory or the like, the distance detection value L acquired in step 250 as a reference value Lref of the distance to the partner device (see also FIG. 7A).

Figure 8A:
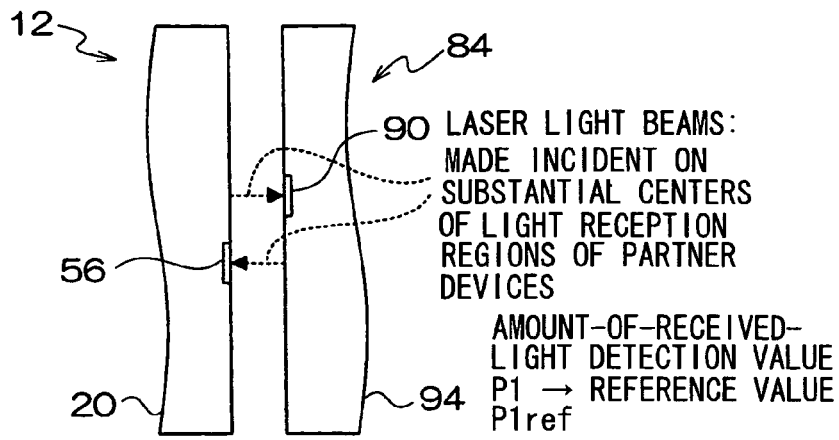
FIG. 8A, FIG. 8B and FIG. 8C are conceptual diagrams for illustrating the sensing of a change in position based on quantities of received laser light.

In step 254, the position monitor acquires, via the communication controller of its own device, the amount of laser light received by the PD (amount-of-received-laser-light detection value (laser light detection value) P1) that has been detected by the demodulator of its own device immediately after data transfer initiation and at a timing when the PD is receiving the laser light. This laser light detection value P1 represents the amount of laser light received by the PD in a state where the relative positions of the electronic cassette 12 and the image reading device 84 are adjusted to the communicable positional relationship. As the laser light detection value P1, there may be applied any of a maximum value or an average value of the amount of received laser light in the period of time when the PD is receiving the laser light, or a received-light amount value where a cumulative frequency from a maximum value or a minimum value reaches a predetermined value on a histogram of the amount of received laser light. Alternatively, it is also possible to use another value as long as it is a value that represents the amount of laser light received by the PD in a state where the relative positions of the electronic cassette 12 and the image reading device 84 are adjusted to the communicable positional relationship. In step 256, the position monitor stores, in a built-in memory or the like, the laser light detection value P1 acquired in step 254 as a reference value P1ref of the amount of laser light received by the PD (see also FIG. 8A).

In step 258, the position monitor again acquires, the current distance (distance detection value L) to the partner device detected by the distance sensor of its own device. In step 260, the position monitor determines whether or not the distance detection value L acquired in step 258 is equal to or greater than the sum of a predetermined value $\alpha$ and the reference value Lref of the distance to the partner device (L$\geq$Lref+$\alpha$). When this determination is negative, it can be judged that the change in the distance to the partner device in the disposed position of the distance sensor is within an allowable range. Consequently, the processing moves to step 262 and again acquires, via the communication controller of its own device, the most recent amount of laser light received by the PD (amount-of-received-laser-light detection value (laser light detection value) P1) that has been detected by the demodulator of its own device. In step 264, the position monitor determines whether or not the laser light detection value P1 acquired in step 262 is equal to or less than the difference between the reference value P1ref and a predetermined value $\beta$ (P1$\leq$P1ref−$\beta$). It will be noted that the value of the predetermined value $\beta$ can be selected in accordance with what kind value among the values previously listed values (maximum value, minimum value, etc.) is used as the laser light detection value P1. When the determination in step 264 is negative, it can be judged that the drop in the amount of laser light received by the PD is within an allowable range, so the processing moves to step 266. In step 266, the position monitor determines whether or not it has been instructed by the communication controller of its own device to terminate the change-in-position monitoring processing. When this determination is also negative, the processing returns to step 258.

Thus, step 258 to step 266 are repeated until the determination in any of steps 260, 264 and 266 becomes affirmative, and a change in the distance detection value L and a change in the laser light detection value P1 are monitored. The determinations in step 260 and 264 do not become affirmative when, while communication between the electronic cassette 12 and the image reading device 84 is being performed, the relative positions of the electronic cassette 12 and the image reading device 84 do not change or the amount of change in the relative positions is minute. Consequently, when the position monitor is instructed by the communication controller of its own device to terminate the change-in-position monitoring processing, the determination in step 266 becomes affirmative and the position monitor terminates the change-in-position monitoring processing.

Due to pressing force or vibration acting on at least one of the casing 20 of the electronic cassette 12 and the casing 94 of the image reading device 84, the relative positions of the electronic cassette 12 and the image reading device 84 may change, for example, from the state shown in FIG. 7A to the state shown in FIG. 7B while communication between the electronic cassette 12 and the image reading device 84 is being performed. In this case (when there is a relatively large change in the relative positions), as shown in FIG. 7B, the potential arises for laser light to leak out from the intervening space between the opposing surface 60 of the electronic cassette 12 and the opposing surface 96 of the image reading device 84 as a result of the laser light emitted from the electronic cassette 12 or the image reading device 84 greatly shifting from the center of the light receiving surface of the partner device.

When the relative positions of the electronic cassette 12 and the image reading device 84 relatively largely change, the distance to the casing of the partner device in the disposed position of the distance sensor (the lengths of the solid line arrows shown in FIG. 7B) also changes in accompaniment therewith. For that reason, in the example of FIG. 7B, the distance detection value L that corresponds to the solid line arrow of the two solid line arrows positioned above in the drawing increases considerably, whereby the determination in step 260 becomes affirmative. Consequently, by monitoring the distance detection value L, the position monitor can sense a change in the relative positions of the electronic cassette 12 and the image reading device 84 that has the potential to lead to leakage of the laser light.

Figure 8B:
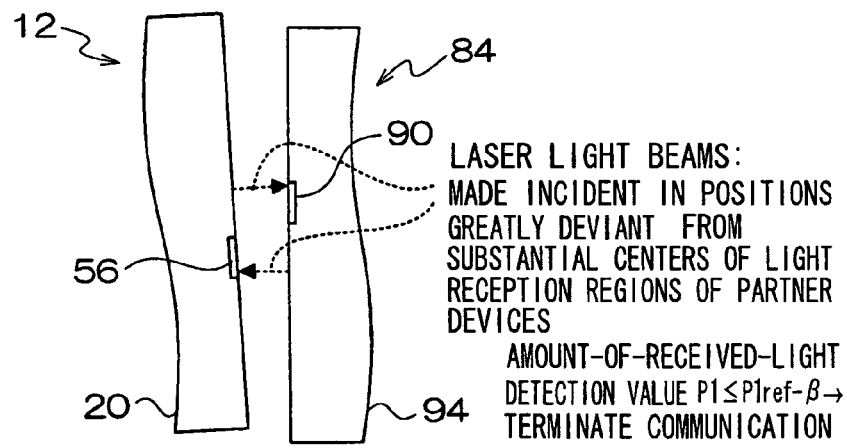
Figure 8C:
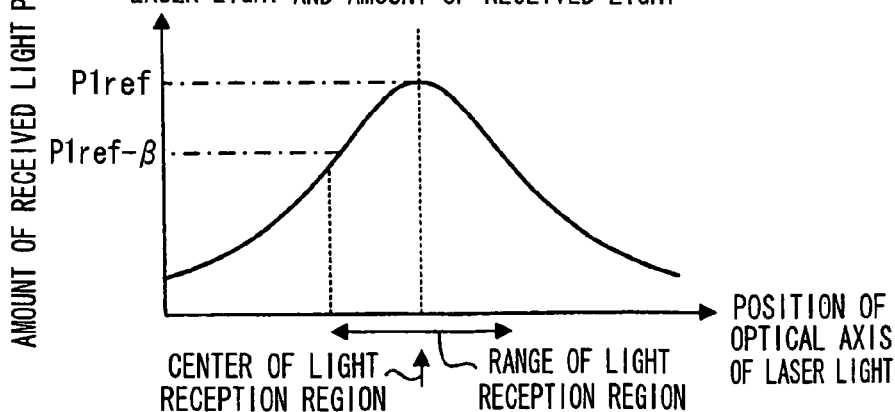

Further, the amount of laser light received by the PD changes as shown in FIG. 8C with respect to the change in the position of the optical axis of the laser light incident on the PD, and as the amount of bias of the position of the optical axis of the laser light with respect to the central position of the light reception region becomes larger, the amount of laser light received by the PD greatly attenuates. When the relative positions of the electronic cassette 12 and the image reading device 84 relatively largely change, as shown in FIG. 8B, the incident positions of the laser light on the PDs of the electronic cassette 12 and the image reading device 84 greatly shift from the centers of the light reception regions and the laser light detection value P1 decreases considerably, so the determination in step 264 becomes affirmative. Consequently, by also monitoring the laser light detection value P1, the position monitor can sense a change in the relative positions of the electronic cassette 12 and the image reading device 84 that has the potential to lead to leakage of the laser light. When the determination in step 260 or step 264 is affirmative, the processing moves to step 268 to instruct the communication controller of its own device to terminate communication, and the change-in-position monitoring processing is ended.

When the position monitor 114 of the image reading device 84 instructs the communication controller 108 to terminate communication, the determination in step 170 of the data reading processing (FIG. 4B) becomes affirmative and the processing moves to step 180. In step 180, the communication controller 108 determines whether or not the instruction to terminate communication is from the partner device. In this example, since the source of the instruction to terminate communication is the position monitor 114 of the image reading device 84, the determination is negative and the processing moves to step 182. In step 182, the communication controller 108 instructs by laser light the partner device (the electronic cassette 12) to terminate communication. In step 186, the communication controller 108 causes the LD 86 to stop emission of the laser light. In the next step 188, the communication controller 108 performs error processing, such as displaying on the display 118 an error message notifying the partner device of the termination of communication and the reason for the termination of communication (e.g., the casing has greatly moved), and ends the data reading processing (FIG. 4B). Further, in the electronic cassette 12, which has been instructed by the image reading device 84 to terminate communication, the determination in step 220 of the data transfer processing (FIG. 5) becomes affirmative, and the processing moves to step 222 to determine whether or not the instruction to terminate communication is from the partner device. In this example, the determination is affirmative, and the processing moves to step 226 to instruct the position monitor 78 to end the change-in-position monitoring processing (FIG. 6). Then, in step 228, the communication controller 72 causes the LD 52 to stop emission of the laser light and ends the data transfer processing (FIG. 5).

When the position monitor 78 of the electronic cassette 12 instructs the communication controller 72 to terminate communication, the determination in step 220 of the data transfer processing (FIG. 5) is affirmative, the determination in step 222 is negative, and the processing moves to step 224. In step 224, the communication controller 72 instructs the partner device (the image reading device 84) by laser light to terminate communication. Then, in step 228, the communication controller 72 causes the LD 52 to stop emission of the laser light and ends the data transfer processing (FIG. 5). Further, in the image reading device 84, which has been instructed by the electronic cassette 12 to terminate communication, in step 184, the communication controller 108 instructs the position monitor 114 to end the change-in-position monitoring processing (FIG. 6). Then, in step 186, the communication controller 108 causes the LD 86 to stop emission of the laser light, and in step 188, the communication controller 108 performs the aforementioned error processing and ends the data reading processing (FIG. 4B).

According to the above-described processing, when either of the position monitor 78 of the electronic cassette 12 and the position monitor 114 of the image reading device 84 has detected a change in the relative positions of the electronic cassette 12 and the image reading device 84 that has the potential to lead to leakage of the laser light, emission of the laser light from the electronic cassette 12 and emission of the laser light from the image reading device 84 are each stopped.

In the first exemplary embodiment, a partial region, including the area surrounding the light reception hole 64 (and the emission hole 62), of the opposing surface 60 of the casing 20 of the electronic cassette 12 is covered by the diffusion member 66. Further, a partial region, including the area surrounding the light reception hole 100 (and the emission hole 98), of the opposing surface 96 of the casing 94 of the image reading device 84 is covered by the diffusion member 102. For that reason, even if a relatively large change in the relative positions occurs in the middle of communication between the electronic cassette 12 and the image reading device 84 and a state temporarily arises where, until emission of the laser light is stopped by the aforementioned processing, a position that is deviant from the light reception hole in the opposing surface of the partner device is irradiated with the laser light emitted from the electronic cassette 12 or the image reading device 84, the laser light irradiated on the opposing surface of the partner device is reflected in mutually different plural directions by the diffusion member disposed in the position irradiated with the laser light, i.e., the reflection light is diffused. For that reason, even when the reflected laser light leaks out from the intervening space between the opposing surface 60 of the electronic cassette 12 and the opposing surface 96 of the image reading device 84, the light amount of the laser light irradiated on a specific site outside of the intervening space can be made extremely weak.

Second Exemplary Embodiment

Figure 9:
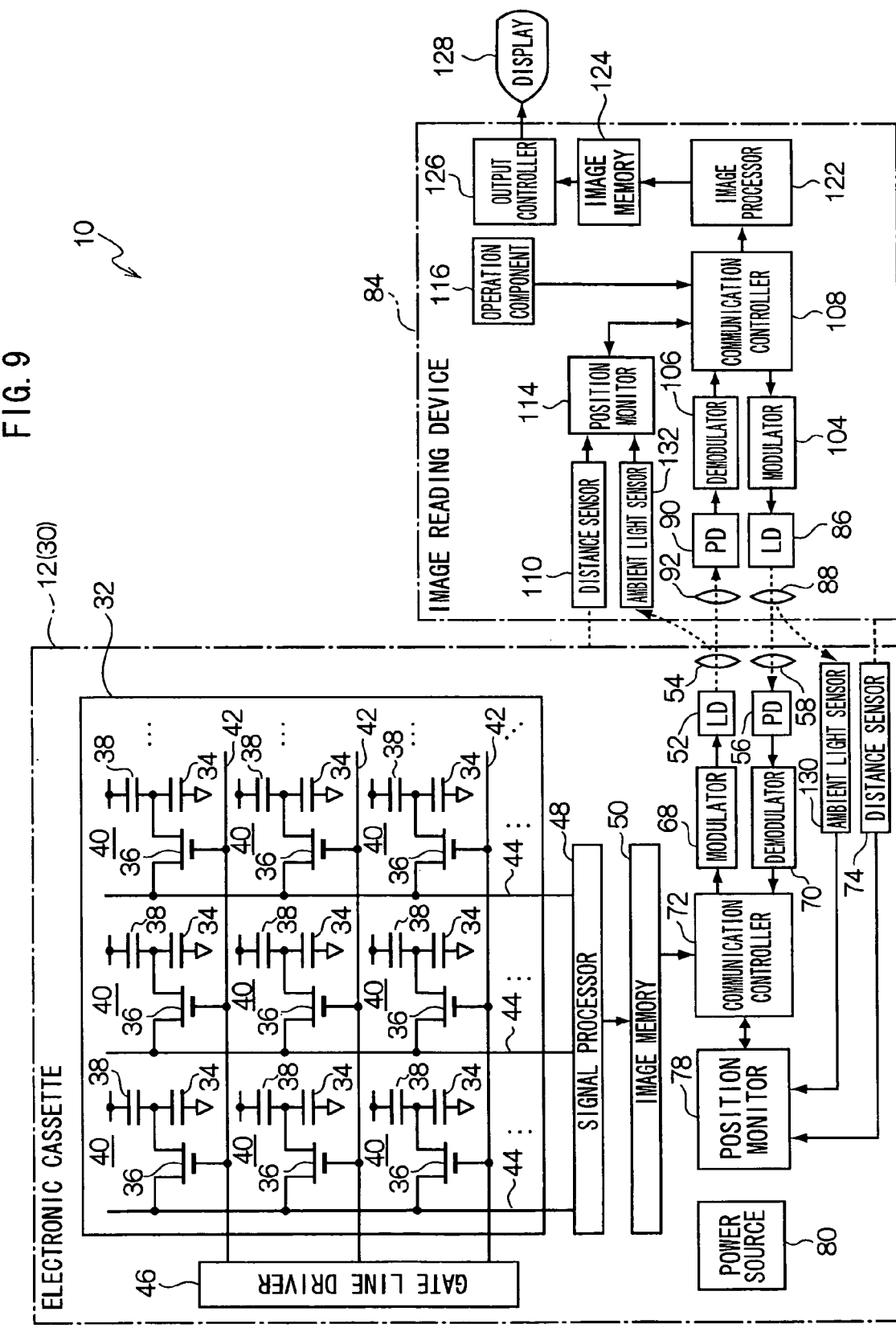
FIG. 9 is a block diagram showing the general configurations of an electronic cassette and an image reading device pertaining to a second exemplary embodiment.

Next, a second exemplary embodiment of the present invention will be described. It will be noted that identical reference numerals will be given to portions that are identical to portions in the first exemplary embodiment and that description of those portions will be omitted. The second exemplary embodiment differs from the first exemplary embodiment in that, as shown in FIG. 9, an ambient light sensor 130 is disposed in the electronic cassette 12 and an ambient light sensor 132 is disposed in the image reading device 84.

Figure 10A:
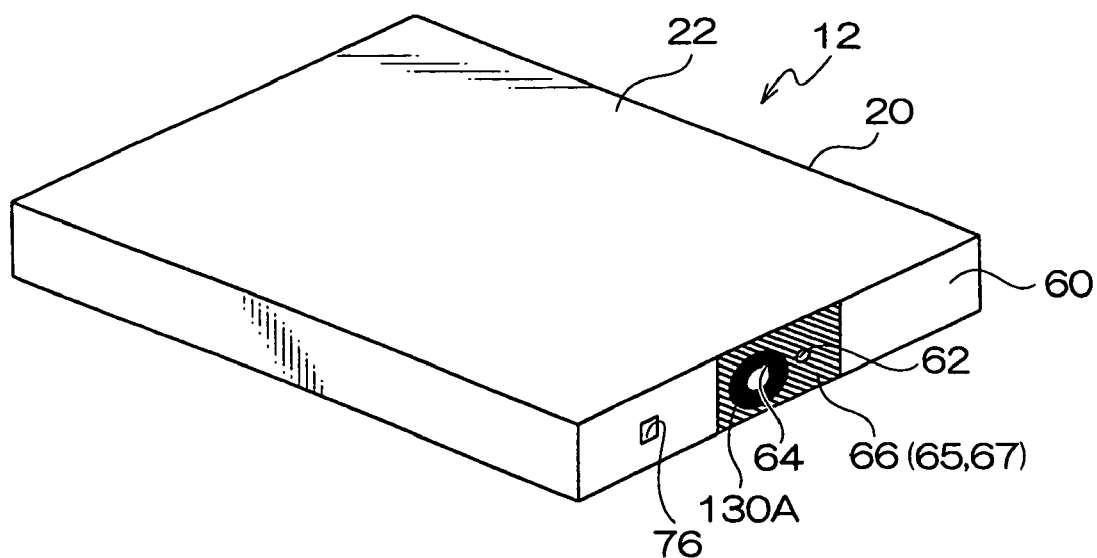
FIG. 10A is a perspective diagram showing the appearance of the electronic cassette of the second exemplary embodiment.

As shown in FIG. 10A, the ambient light sensor 130 disposed in the electronic cassette 12 has a detection region 130A configured as an annular region surrounding the light reception hole 64 in the opposing surface 60 of the casing 20. The ambient light sensor 130 is equipped with plural photoelectric conversion elements implemented by PDs or the like that are almost evenly distributed in the detection region 130A. As the photoelectric conversion elements that configure the ambient light sensor 130, there can be used spectral sensitivity characteristic photoelectric conversion elements that are sensitive to the laser light emitted from the LD 86 of the image reading device 84. The ambient light sensor 130 is connected to the position monitor 78 and outputs to the position monitor 78 a signal that indicates, for example, the total amount of light received by the plural photoelectric conversion elements or a maximum value of the amount of light received by the individual photoelectric conversion elements. In the second exemplary embodiment, the diffusion member 66 is disposed in a range excluding the detection region 130A of the disposed range on the opposing surface 60 described in the first exemplary embodiment.

Figure 10B:
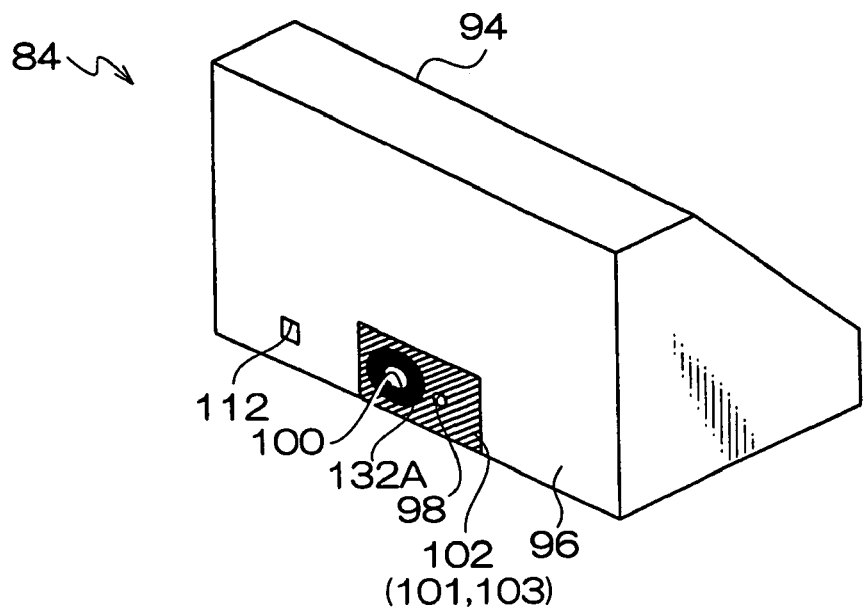
FIG. 10B is a perspective diagram showing the appearance of the image reading device.

Further, as shown in FIG. 10B, the ambient light sensor 132 disposed in the image reading device 84 has a detection region 132A configured as an annular region surrounding the light reception hole 100 in the opposing surface 96 of the casing 94. The ambient light sensor 132 is equipped with plural photoelectric conversion elements implemented by PDs or the like that are almost evenly distributed in the detection region 132A. As the photoelectric conversion elements that configure the ambient light sensor 132, there can be used spectral sensitivity characteristic photoelectric conversion elements that are sensitive to the laser light emitted from the LD 52 of the electronic cassette 12. The ambient light sensor 132 is connected to the position monitor 114 and outputs to the position monitor 114 a signal that indicates, for example, the total amount of light received by the plural photoelectric conversion elements or a maximum value of the amount of light received by the individual photoelectric conversion elements. The diffusion member 102 is also disposed in a range excluding the detection region 132A of the disposed range on the opposing surface 96 described in the first exemplary embodiment.

Next, the change-in-position monitoring processing performed by the position monitor 78 and 114 pertaining to the second exemplary embodiment will be described with reference to FIG. 11, for only portions that differ from the first exemplary embodiment. In the change-in-position monitoring processing pertaining to the second exemplary embodiment, a change in the relative positions of the electronic cassette 12 and the image reading device 84 are sensed on the basis of the amount of light received by the ambient light sensors 130 and 132, instead of the amount of laser light received by the PDs.

That is, in the change-in-position monitoring processing pertaining to the second exemplary embodiment, the position monitor acquires the distance detection value L from the distance sensor in step 250, and in step 252, the position monitor stores the acquired distance detection value L as a reference value Lref of the distance to the partner device. In the next step 255, the position monitor acquires the amount of received laser light (amount-of-received-laser-light detection value P2) detected by the ambient light sensor disposed in its own device immediately after data transfer initiation and at a time when the PD is receiving the laser light. This step is performed at a time immediately after the relative positions of the electronic cassette 12 and the image reading device 84 are adjusted to the communicable positional relationship. Consequently, the amount-of-received-laser-light detection value (laser light detection value) P2 acquired in step 255 represents the amount of laser light received by the ambient light sensor in a state where the relative positions of the electronic cassette 12 and the image reading device 84 are adjusted to the communicable positional relationship.

Figure 12A:
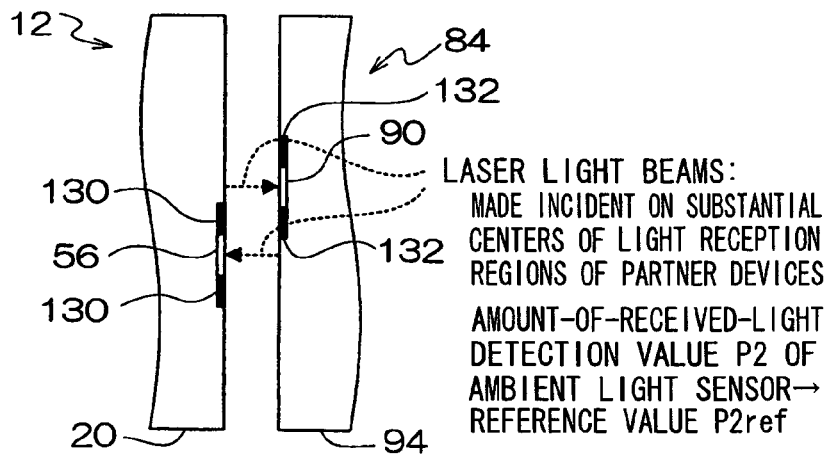
FIG. 12A, FIG. 12B and FIG. 12C are conceptual diagrams for illustrating the sensing of a change in position based on quantities of light received by ambient light sensors.

The laser light detection value P2 may be any of a maximum value or an average value of the amount of laser light received by the ambient light sensor in the period of time when the PD is receiving the laser light, or a amount-of-received-light value where a cumulative frequency from a maximum value or a minimum value reaches a predetermined value on a histogram of the amount of received laser light. Alternatively, any other value can be used as long as it represents the amount of laser light received by the ambient light sensor in a state where the relative positions of the electronic cassette 12 and the image reading device 84 are adjusted to the communicable positional relationship. In step 257, the position monitor stores, in a built-in memory or the like, the laser light detection value P2 acquired in step 255 as a reference value P2ref of the amount of laser light received by the ambient light sensor (see also FIG. 12A).

In step 258, the position monitor again acquires the distance detection value L from the distance sensor. When the acquired distance detection value L does not satisfy "L≧Lref+α" (i.e., when the determination in step 260 is negative), in step 263, the position monitor again acquires the most recent amount of laser light received (laser light detection value P2) by the ambient light sensor of its own device. In step 265, the position monitor determines whether or not the laser light detection value P2 acquired in step 263 is equal to or greater than the sum of a predetermined value γ and the reference value P2ref (P2≧P2ref+γ). The predetermined value γ can also be selected in accordance with what kind of value among the previously listed values (maximum value, minimum value, etc.) is used as the laser light detection value P2. When the determination in step 265 is negative, it can be judged that, even if the amount of laser light received by the ambient light sensor has increased, the amount of that increase is within an allowable range, and therefore, the processing moves to step 266.

In this manner, while communication between the electronic cassette 12 and the image reading device 84 is being performed, step 258 to step 266 are repeated and a change in the distance detection value L and a change in the laser light detection value P2 are monitored. During this period, when the relative positions of the electronic cassette 12 and the image reading device 84 do not change or the amount of change in the relative positions is minute, the distance detection value L and the laser light detection value P2 also do not change or the amount of change is minute. Therefore, the determination in step 265 (or step 260) will not become affirmative, and the change-in-position monitoring processing ends when the position monitor is instructed by the communication controller of its own device to end the change-in-position monitoring processing.

Figure 12B:
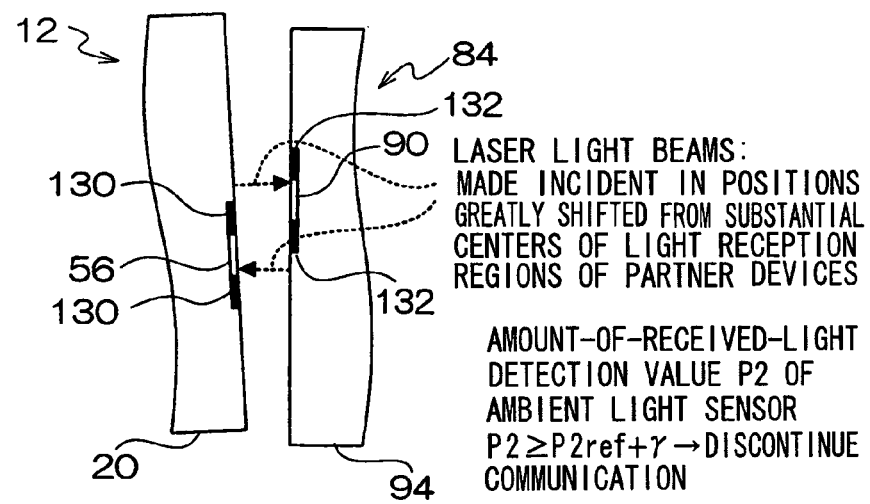
Figure 12C:
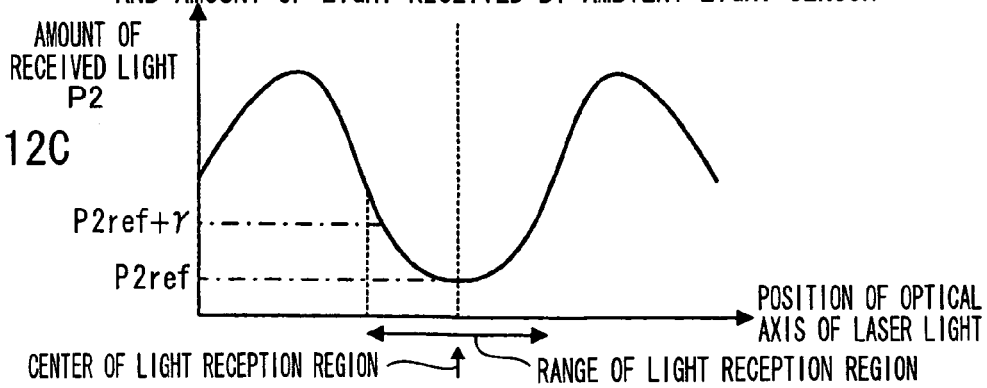

When the position of the optical axis of the laser light that is made incident on the PD changes, as shown in FIG. 12C, the amount of laser light received by the ambient light sensor first increases and reaches a maximum value as the amount of bias of the position of the optical axis of the laser light with respect to the central position of the light reception region of the PD becomes larger, and when that amount of bias becomes even larger, the amount of laser light received by the ambient light sensor decreases. Due to pressing force or vibration acting on at least one of the casing 20 of the electronic cassette 12 and the casing 94 of the image reading device 84, the relative positions of the electronic cassette 12 and the image reading device 84 may change from the state shown in FIG. 12A to the state shown in FIG. 12B while communication between the electronic cassette 12 and the image reading device 84 is being performed. In this case (that is, when there is a relatively large change in the relative positions), as shown in FIG. 12B, since the incident positions of the laser light on the PDs of the electronic cassette 12 and the image reading device 84 greatly shift from the centers of the light reception regions and the laser light detection value P2 increases considerably, the determination in step 265 becomes affirmative.

When the relative positions of the electronic cassette 12 and the image reading device 84 change even more largely, as will be apparent also from FIG. 12C, the change in the laser light detection value P2 increases to a maximum value and thereafter decreases. However, at the time when the change-in-position monitoring processing is initiated, the relative positions of the electronic cassette 12 and the image reading device 84 are adjusted to the positional relationship shown in FIG. 12A, and during execution of the change-in-position monitoring processing, a change in the laser light detection value P2 is constantly monitored. Therefore, during the period until the laser light detection value P2 increases to a maximum value in accompaniment with bias of the position of the optical axis of the laser light, the increase in the laser light detection value P2 is sensed and the determination in step 265 becomes affirmative. Consequently, by monitoring the laser light detection value P2, the position monitor can sense a change in the relative positions of the electronic cassette 12 and the image reading device 84 that has the potential to lead to leakage of the laser light.

In the second exemplary embodiment, a partial region, including the area surrounding the light reception hole 64 (and the emission hole 62) and the detection region 130A where the ambient light sensor 130 is disposed, of the opposing surface 60 of the casing 20 of the electronic cassette 12 is covered by the diffusion member 66. Further, a partial region, including the area surrounding the light reception hole 100 (and the emission hole 98) and the detection region 132A where the ambient light sensor 132 is disposed, of the opposing surface 96 of the casing 94 of the image reading device 84 is also covered by the diffusion member 102. For that reason, even if a relatively large change in the relative positions occurs in the middle of communication between the electronic cassette 12 and the image reading device 84 and a state temporarily arises where, until emission of the laser light is stopped by the aforementioned processing, a position that is deviant from the light reception hole in the opposing surface of the partner device is irradiated with the laser light emitted from the electronic cassette 12 or the image reading device 84, the laser light irradiated on the opposing surface of the partner device is reflected in mutually different plural directions by the diffusion member, and the reflection light is diffused. For that reason, even when the reflected laser light leaks out from the intervening space between the opposing surface 60 of the electronic cassette 12 and the opposing surface 96 of the image reading device 84, the light amount of the laser light irradiated on a specific site outside of the intervening space can be made extremely weak.

Modification 1

In the first and second exemplary embodiments, examples have been described where the diffusion member 66 is used as a suppression member that suppresses leakage of the laser light from the intervening space between the opposing surface 60 of the electronic cassette 12 and the opposing surface 96 of the image reading device 84.

The diffusion member 66 may be replaced by an absorption member that absorbs the majority of the irradiated laser light.

That is, referring to FIG. 3, the partial region, including the area surrounding the light reception hole 64 (and the emission hole 62), of the opposing surface 60 of the casing 20 of the electronic cassette 12 may be covered by an absorption member 65 that absorbs the majority of the irradiated laser light.

The partial region can be provided so as to surround the light reception hole 64 and the emission hole 62 in the opposing surface 60. Further, the partial region may also include a range of the opposing surface 60 where it is predicted that a shift in the laser light will occur when the user disposes the electronic cassette 12 and the image reading device 84 face-to-face in order to read the image data from the electronic cassette 12. Alternately, the entire opposing surface 60 may be covered by the absorption member 65.

Figure 13:
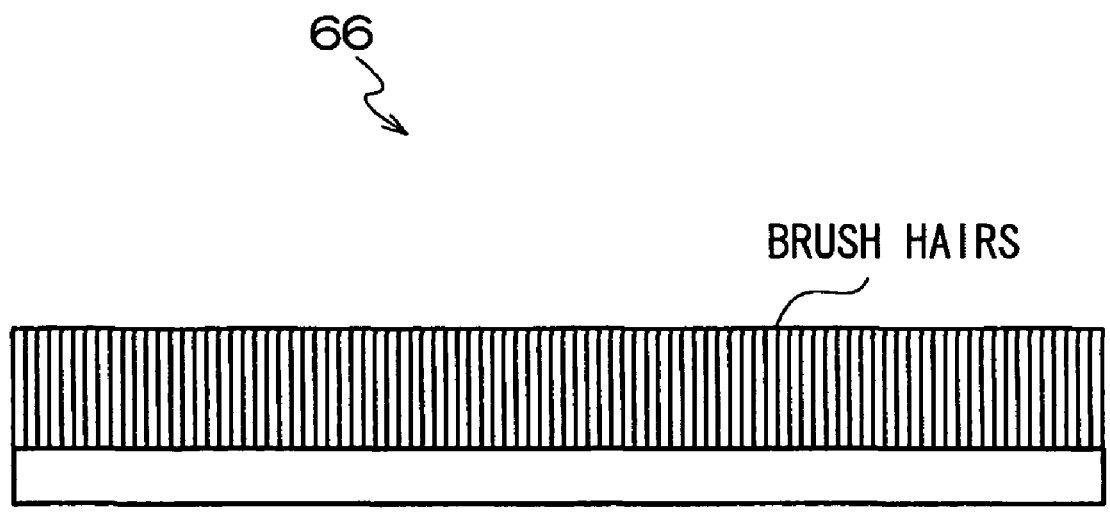
FIG. 13 is a conceptual diagram showing the cross section of a flocked member.
Figure 14A:
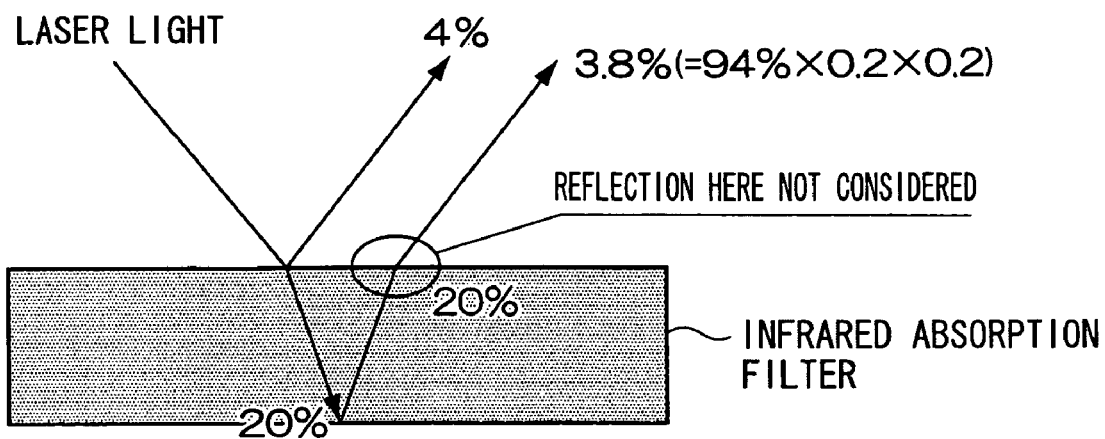
FIG. 14A and FIG. 14B are conceptual diagrams for describing the effect of the absorption of a laser beam by an infrared absorption filter.
Figure 14B:
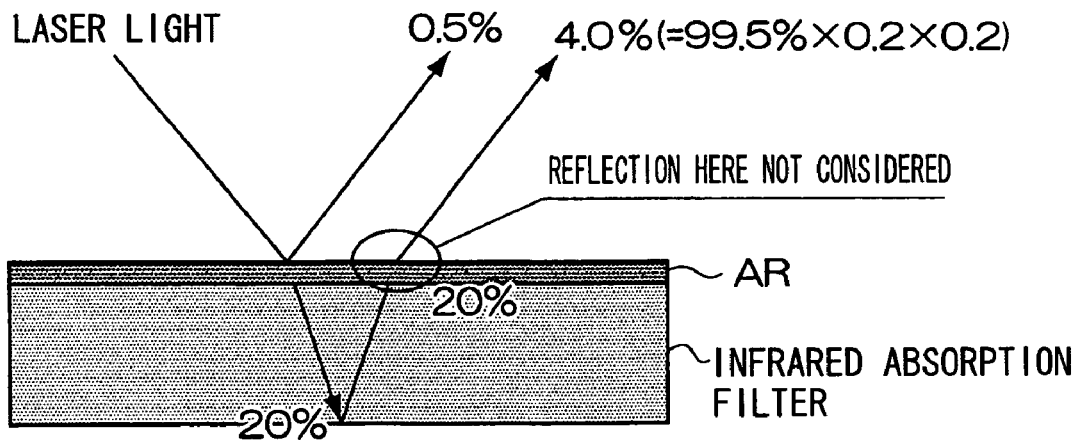

Examples of the absorption member 65 may include a flocked member such as shown in FIG. 13 where brush hairs are flocked in its surface, a porous material such as charcoal, a member whose surface is black, and an optical filter that has wavelength selectivity (specifically, a light absorption filter that has light absorbability with respect to the wavelength region of the irradiated laser light). A flocked member or a porous material scatters the laser light that is made incident by hairs or a porous surface therein and absorbs the laser light by absorbing energy each time the light is reflected by scattering. Further, by blackening the surface of the absorption member or disposing an infrared absorption filter in the surface of the absorption member, the laser light can be absorbed. Examples of this infrared absorption filter may include a color filter that uses colored glass as its material and can absorb laser light of a specific wavelength. For example, as shown in FIG. 14A, when the infrared absorption filter is configured such that, each time a light beam passes therethrough one time, the light amount of the light beam is attenuated 80%, the light amount of the entire reflected light beam with respect to the light beam incident on the infrared absorption filter is about 7.8% (=4.0%+3.8%). As shown in FIG. 14B, an antireflection coat (AR coat) may also be applied to the surface of the infrared absorption filter. In this manner, when an antireflection coat is applied to the surface of the infrared absorption filter, the light amount of the entire reflected light beam with respect to the light beam incident on the infrared absorption filter is about 4.5% (=0.5%+4.0%), and reflection is further suppressed. It will be noted that reflection when the light beam emerges from the inside of the infrared absorption filter is not considered in the above example.

Further, the partial region, including the area surrounding the light reception hole 100 (and the emission hole 98), of the opposing surface 96 of the casing 94 of the image reading device 84 may also be covered by an absorption member 101 in the same manner as the electronic cassette 12.

In this manner, in the first exemplary embodiment to which modification 1 is applied, a partial region, including the area surrounding the light reception hole 64 (and the emission hole 62), of the opposing surface 60 of the casing 20 of the electronic cassette 12 is covered by the absorption member 65. Moreover, a partial region, including the area surrounding the light reception hole 100 (and the emission hole 98), of the opposing surface 96 of the casing 94 of the image reading device 84 is also covered by the diffusion member 101. Therefore, even if a relatively large change in the relative positions occurs in the middle of communication between the electronic cassette 12 and the image reading device 84 and a state temporarily arises where, until the change in the relative positions is detected and emission of the laser light is stopped, a position that is deviant from the light reception hole in the opposing surface of the partner device is irradiated with the laser light emitted from the electronic cassette 12 or the image reading device 84, the absorption members 65 and 101 are irradiated with the laser light, and the majority of the laser light is absorbed by the absorption members 65 and 101. For that reason, the light amount of the laser light that leaks out from the intervening space between the opposing surface 60 of the electronic cassette 12 and the opposing surface 96 of the image reading device 84 can be made extremely weak.

In the second exemplary embodiment, as shown in FIG. 10A, the absorption member 65 can, be also disposed on the opposing surface 60 of the electronic cassette 12 in a range excluding the detection region 130A of the opposing surface 60 described in the first exemplary embodiment.

As shown in FIG. 10B, the absorption member 101 can be disposed on the opposing surface 96 of the image reading device 84 in a range excluding the detection region 132A of the opposing surface 96 described in the first exemplary embodiment.

In this manner, in the second exemplary embodiment also to which modification 1 is applied, a partial region, including the area surrounding the light reception hole 64 (and the emission hole 62) and the detection region 130A where the ambient light sensor 130 is disposed, of the opposing surface 60 of the casing 20 of the electronic cassette 12 can be covered by the absorption member 65. Moreover, a partial region, including the area surrounding the light reception hole 100 (and the emission hole 98) and the detection region 132A where the ambient light sensor 132 is disposed, of the opposing surface 96 of the casing 94 of the image reading device 84 can be also covered by the diffusion member 101. For that reason, even if a relatively large change in the relative positions occurs in the middle of communication between the electronic cassette 12 and the image reading device 84 and a state temporarily arises where, until the change in the relative positions is detected and emission of the laser light is stopped, a position that is deviant from the light reception hole in the opposing surface of the partner device is irradiated with the laser light emitted from the electronic cassette 12 or the image reading device 84, the absorption members 65 and 101 are irradiated with the laser light whose irradiation positions have deviated from the light reception holes, and the majority of the laser light is absorbed by the absorption members 65 and 101. For that reason, the light amount of the laser light that leaks out from the intervening space between the opposing surface 60 of the electronic cassette 12 and the opposing surface 96 of the image reading device 84 can be made extremely weak.

Modification 2

In the first and second exemplary embodiments, examples have been described where the diffusion member 66 is used as a suppression member that suppresses leakage of the laser light from the intervening space between the opposing surface 60 of the electronic cassette 12 and the opposing surface 96 of the image reading device 84.

The diffusion member 66 may also be replaced by a light emission member whose portion being irradiated with laser light of a wavelength in the infrared region emits light in the visible region.

That is, referring to FIG. 3, the partial region, including the area surrounding the light reception hole 64 (and the emission hole 62), of the opposing surface 60 of the casing 20 of the electronic cassette 12 can be covered by a light emission member 67 whose portion that has been irradiated in accompaniment with being irradiated with laser light of a wavelength in the infrared region emits light in the visible region.

The partial region can be disposed so as to surround the light reception hole 64 and the emission hole 62 in the opposing surface 60. Further, the partial region may also include a range of the opposing surface 60 where it is predicted that a shift in the laser light will occur when the user disposes the electronic cassette 12 and the image reading device 84 face-to-face in order to read the image data from the electronic cassette 12. Alternately, the entire opposing surface 60 may be covered by the light emission member 67.

As the light emission member 67, when the wavelength of the laser light emitted from the LD 52 is in the infrared region, the optical path checking fluorescent sheet (Laser Detection Card IR) for near-infrared made by Edmund Optics Inc, or the like can be used.

Further, the partial region, including the area surrounding the light reception hole 100 (and the emission hole 98), of the opposing surface 96 of the casing 94 of the image reading device 84 may also be covered by a light emission member 103 in the same manner as the electronic cassette 12.

In this manner, in the first exemplary embodiment to which modification 2 is applied, a partial region, including the area surrounding the light reception hole 64 (and the emission hole 62), of the opposing surface 60 of the casing 20 of the electronic cassette 12 is covered by the light emission member 67. Further, a partial region, including the area surrounding the light reception hole 100 (and the emission hole 98), of the opposing surface 96 of the casing 94 of the image reading device 84 is also covered by the light emission member 103. Therefore, even if a relatively large change in the relative positions occurs in the middle of communication between the electronic cassette 12 and the image reading device 84 and a state temporarily arises where, until the change in the relative positions is detected and emission of the laser light is stopped, a position that is deviant from the light reception hole in the opposing surface of the partner device is irradiated with the non-visible laser light emitted from the electronic cassette 12 or the image reading device 84, the light emission (fluorescent) members are irradiated with the non-visible laser light, and the irradiated light emission (fluorescent) members emit light (visible light). Thus, the user can be aware of the fact that the irradiation positions of the non-visible laser light have deviated from the light reception holes and the fact that there is the potential that the non-visible laser light is leaking out from the intervening space between the opposing surface 60 of the electronic cassette 12 and the opposing surface 96 of the image reading device 84. Additionally, it becomes possible to allow the user to take measures to avoid a situation where a specific site outside of the intervening space (a site for which it is not desirable to be irradiated with laser light) is irradiated with the leaking non-visible laser light.

In the second exemplary embodiment, as shown in FIG. 10A, the light emission member 67 can be also disposed on the opposing surface 60 of the electronic cassette 12 in a range excluding the detection region 130A of the disposed range on the opposing surface 60 described in the first exemplary embodiment.

Further, as shown in FIG. 10B, the light emission member 103 can be disposed on the opposing surface 96 of the image reading device 84 in a range excluding the detection region 132A of the disposed range on the opposing surface 96 described in the first exemplary embodiment.

In this manner, in the second exemplary embodiment to which modification 2 is applied, a partial region, including the area surrounding the light reception hole 64 (and the emission hole 62) and the detection region 130A where the ambient light sensor 130 is disposed, of the opposing surface 60 of the casing 20 of the electronic cassette 12 is covered by the light emission member 67. Moreover, a partial region, including the area surrounding the light reception hole 100 (and the emission hole 98) and the detection region 132A where the ambient light sensor 132 is disposed, of the opposing surface 96 of the casing 94 of the image reading device 84 is also covered by the light emission member 103. Therefore, even if a relatively large change in the relative positions occurs in the middle of communication between the electronic cassette 12 and the image reading device 84 and a state temporarily arises where, until the change in the relative positions is detected and emission of the laser light is stopped, a position that is deviant from the light reception hole in the opposing surface of the partner device is irradiated with the non-visible laser light that is emitted from the electronic cassette 12 or the image reading device 84, the light emission (fluorescent) members are irradiated with the non-visible laser light, and the light emission (fluorescent) members emit light (visible light). Thus, the user can be aware of the fact that the irradiation positions of the non-visible laser light have deviated from the light reception holes and the fact that there is the potential that the non-visible laser light is leaking out from the intervening space between the opposing surface 60 of the electronic cassette 12 and the opposing surface 96 of the image reading device 84. Additionally, it becomes possible to allow the user to take measures to avoid a situation where a specific site outside of the intervening space (a site for which it is not desirable to be irradiated with laser light) is irradiated with the leaking non-visible laser light.

Other Modifications

In the preceding exemplary embodiments, the distance sensors 74 and 110 (distance sensors) are described as having a configuration that detects the distance to a target object on the basis of the amount of time from when light is emitted by a light emitting element to until the emitted light is reflected by the target object and received by a light receiving element. However, the exemplary embodiments are not limited to this, and the distance sensors may be configured to detect a light reception position when the light emitted from the light emitting element is reflected by the target object and received by the light receiving element, and detect the distance to the target object by the principle of triangulation using the detected light reception position. Further, the distance sensors may also be configured such that an electric field generator that generates an electric field of a constant intensity or a magnetic field generator that generates a magnetic field of a constant intensity is disposed in the partner device, and that the distance sensor detects the intensity of the electric field or the magnetic field generated by the electric field generator or the magnetic field generator of the partner device and detects the distance to the target object on the basis of the detected intensity.

Moreover, the distance sensors are not limited to a configuration that senses the distance to the partner device. The distance sensors may also have a configuration that detects or estimates whether or not the distance to the partner device is equal to or less than a threshold value. For example, when the devices that perform communication by laser light are configured to perform communication by laser light in a state where they are contacting or extremely close to the partner device, for example, the distance sensors may also configured to include a movable member and a displacement detector that detects displacement of the movable member (e.g., a limit switch or the like). The distance sensors may be configured such that, in a state where the devices that perform communication by laser light are contacting or extremely close to each other, a distance sensor (a limit switch or the like) is disposed such that the movable member is contacted and displaced by the casing of the partner device, and the distance sensor detects whether or not displacement of the movable member is detected by the displacement detector, that is, whether or not the distance to the partner device is equal to or less than a threshold value.

The devices that perform communication by laser light may also be equipped with wireless communication components that perform wireless communication using electromagnetic waves other than laser light. In wireless communication by these wireless communication components, communicable inter-device distance and the positional relationship of the devices may be limited, or the communication format in which the communication quality changes considerably depending on the inter-device distance and the positional relationship of the devices (e.g., wireless communication using infrared or the like) may be used. In this case, the distance sensor can acquire data such as the intensity of the electromagnetic waves from the partner device detected by the wireless communication component in the wireless communication or the error rate of wireless communication (e.g., the frequency with which the partner device is requested to retransmit data, the frequency with which error correction has been performed with respect to received data, etc.). Then, the distance sensors may estimate whether or not the distance to the partner device is equal to or less than a threshold value (or whether or not the positional relationship with the partner device is appropriate) on the basis of a result of comparison of the acquired data with a predetermined value.

The distance sensor may also be disposed in only one of the electronic device and the partner device that perform communication by laser light. This configuration can be also applied when one of the electronic device and the partner device emits laser light to perform data transmission and the other performs data transmission by another communication component (e.g., infrared). In this configuration, when it is detected or estimated, by the distance sensor disposed in one of the electronic device and the partner device, that the distance between the devices has become greater than a predetermined value, the device with the distance sensor performs processing to instruct the device without the distance sensor to terminate communication (i.e., stop emission of the laser light) (note that this processing is unnecessary when the device without the distance sensor does not emit laser light). Further, the device with the distance sensor may also stop emission of the laser light (note that this processing is unnecessary when the device with the distance sensor does not emit laser light).

In the first exemplary embodiment, the position monitors detect a change in the relative positions of the electronic cassette 12 and the image reading device 84 using the distance detection value L and the laser light detection value P1 received by the PD, and in the second exemplary embodiment, the position monitors detect a change in the relative positions of the electronic cassette 12 and the image reading device 84 using the distance detection value L and the laser light detection value P2 received by the ambient light sensor. However, the exemplary embodiments are not limited to this, and the position monitors may also be configured to detect a change in the relative positions using all of the distance detection value L, the laser light detection value P1 and the laser light detection value P2. Alternatively, the position monitors may be configured to detect a change in the relative positions using any one of the distance detection value L, the laser light detection value P1, and the laser light detection value P2.

In the above description, the exemplary embodiments are described such that the communication controller instructs the partner device to terminate communication to cause the partner device to stop emission of the laser light when a relatively large change in the relative positions of the electronic cassette 12 and the image reading device 84 that has the potential to lead to leakage of the laser light is detected by the change-in-position monitoring processing by the position monitor of the electronic device. However, the exemplary embodiments are not limited to this; the partner device can be configured such that, during a time while there is no particular abnormality, the electronic device periodically transmits predetermined information (this information may be a normal reply with respect to the data transmission from the partner device) to the partner device and such that, while the partner device is receiving the predetermined information, the partner device performs data transmission by laser light. It is also possible to configure the electronic device to cause the partner device to stop emission of the laser light by stopping transmission of the predetermined information to the partner device when a relatively large change in the relative positions has been detected. In this case, the amount of time from when the relatively large change in the relative positions is detected to until emission of the laser light from the partner device is stopped is dependent on the intervals between the transmissions of the predetermined information, and therefore, the electronic device can be configured to transmit the predetermined information in as short a time interval as possible.

In the first exemplary embodiment and the second exemplary embodiment, exemplary the communication controllers causes each of the electronic cassette 12 and the image reading device 84 to stop emission of the laser light when a relatively large change in the relative positions of the electronic cassette 12 and the image reading device 84 that has the potential to lead to leakage of the laser light has been detected by the change-in-position monitoring processing by the position monitors. However, the exemplary embodiments are not limited to this and may also be configured such that the communication controllers issue a warning to and alert the user by performing at least one of illuminating a lamp, sounding a buzzer and displaying a warning message on the display 118, or the communication controllers may be configured to respectively stop emission of the laser light and output a warning.

In the above description, exemplary embodiments are described where each of the electronic cassette 12 and the image reading device 84 that serve as the electronic devices emits laser light to perform communication. However, the exemplary embodiments are not limited to this and may also be configured such that one of the devices that perform communication emits laser light to perform data transmission and the other performs data transmission by another communication component (e.g., infrared). In this case, considering the fact that an extremely high transmission speed is realized in wireless communication using infrared laser light, a device that transmits even larger quantities of data can be selected as the device that emits laser light to perform data transmission (e.g., in the case of an electronic cassette and an image reading device, the electronic cassette that performs transmission of image data can be selected).

In the above exemplary embodiments, the electronic cassette 12 and the image reading device 84 are described as examples of the electronic devices. However, the embodiment is not limited to this and is also applicable to arbitrary electronic devices that perform wireless communication with other devices. Particularly when considering the fact that an extremely high transmission speed is realized in wireless communication using infrared laser light, the embodiment can be applied to electronic devices where at least one is portable and transmits and receives large quantities of data by wireless communication or to electronic devices whose needs of the transmission and reception of large quantities of data are high. For example, the electronic devices may be an image shooting device such as a digital still camera or a digital video camera, and a device such as a PC or a printer that receives still image data or video image data from these image shooting devices, and these may be configured to perform wireless communication between each other by laser light. Alternately, the electronic devices may be a portable scanner and a device such as a PC or a printer that receives still image data from the scanner, and these may be configured to perform wireless communication between each other by laser light. Further, the electronic devices may be information devices (e.g., mobile telephones, PDAs, etc.) equipped with at least one of a still image or video image shooting function and a music playing function, and these may be configured to perform, by laser light, wireless communication between each other for exchanging image data and music data.

As described above, in the electronic device of the exemplary embodiments, the receiver detects the laser light emitted from the partner device and incident inside the light reception region and demodulates the laser light detection result, whereby the transmission data from the partner device are received. The suppression member that suppresses leakage of the laser light between the casing of the partner device and the casing of the electronic device is disposed in at least an area surrounding the light reception region on the outer surface of the casing of the electronic device.

In the electronic device, suppression member may include a diffusion member that diffuses reflection light of the irradiated laser light by reflecting the irradiated laser light in a plurality of different directions.

In the electronic device, the surface of the diffusion member may be shaped such that plural portions that respectively reflect the irradiated laser light in different directions are provided within a minute region with an area equal to or less than that of an irradiated region irradiated with the laser light.

In the electronic device, the surface roughness Ra of the diffusion member may be equal to or less than 1/10 of the wavelength of the laser light.

The electronic device may further include a reception state detector that detects deterioration of the reception state during reception of the transmission data from the partner device by the receiver; and a first controller that issues a warning or causes the partner device to stop emission of the laser light when deterioration of the reception state is detected.

The electronic device may further include a distance sensor that detects and/or estimates whether or not the distance to the partner device has changed by equal to or greater than a threshold value; and a second controller that issues a warning and/or causes the partner device to stop emission of the laser light when it is detected and/or estimated that the distance to the partner device has changed by equal to or greater than the threshold value.

The electronic device may further include a laser light detector that is disposed in at least the area surrounding the light reception region and that detects the laser light; and a third controller that issues a warning and/or causes the partner device to stop emission of the laser light when the laser light is detected by the laser light detector during reception of the transmission data.

In the electronic device, the laser light may be non-visible laser light with a wavelength outside the visible region.

In the electronic device, the non-visible laser light may be laser light with a wavelength in the infrared region.

In the electronic device, the partner device may be any of an image capture device, a portable information device, a portable radiographic image converter, or an image reading device that reads image data from a portable radiographic image converter.

In the electronic device, the suppression member may be an absorption member that absorbs the majority of the irradiated laser light.

In the electronic device, the absorption member may be any of a flocked member, a porous material, or a member having a black surface.

In the electronic device, the suppression member may be a light emission member including a portion that emits light in the visible region when irradiated with the non-visible laser light.

According to the above-described configuration, leakage of laser light from an intervening space between a partner device and an electronic device can be suppressed.

What is claimed is:

1. An electronic device comprising:
    a casing that comprises, on its outer surface, a light reception region that receives laser light;
    a receiver that receives transmission data from a partner device equipped with an emission component that emits laser light and a modulator that modulates, in accordance with the transmission data, the laser light emitted from the emission component, the receiver detecting, in a state in which relative positions of a casing of the partner device and the casing of the electronic device are adjusted to communicable positions at which the laser light emitted from the partner device is incident within the light reception region of the casing of the electronic device, the laser light that is incident within the light reception region, and demodulating the transmission data from the detected laser light; and
    a suppression member disposed in at least an area surrounding the light reception region and suppressing leakage of the laser light from between the casing of the partner device and the casing of the electronic device.

2. The electronic device of claim 1, wherein the suppression member comprises a diffusion member that diffuses reflection light of the irradiated laser light by reflecting the irradiated laser light in a plurality of different directions.

3. The electronic device of claim 2, wherein the surface of the diffusion member is shaped such that a plurality of portions that respectively reflect the irradiated laser light in different directions are provided within a minute region with an area equal to or less than that of an irradiated region irradiated with the laser light.

4. The electronic device of claim 3, wherein the surface roughness Ra of the diffusion member is equal to or less than 1/10 of the wavelength of the laser light.

5. The electronic device of claim 1, further comprising:
    a reception state detector that detects deterioration of the reception state during reception of the transmission data from the partner device by the receiver; and
    a first controller that issues a warning or causes the partner device to stop emission of the laser light when deterioration of the reception state is detected.

6. The electronic device of claim 1, further comprising:
    a distance sensor that detects and/or estimates whether or not the distance to the partner device has changed by equal to or greater than a threshold value; and
    a second controller that issues a warning and/or causes the partner device to stop emission of the laser light when it is detected and/or estimated that the distance to the partner device has changed by equal to or greater than the threshold value.

7. The electronic device of claim 1, further comprising:
    a laser light detector that is disposed in at least the area surrounding the light reception region and that detects the laser light; and
    a third controller that issues a warning and/or causes the partner device to stop emission of the laser light when the laser light is detected by the laser light detector during reception of the transmission data.

8. The electronic device of claim 1, wherein the laser light is non-visible laser light with a wavelength outside the visible region.

9. The electronic device of claim 8, wherein the non-visible laser light is laser light with a wavelength in the infrared region.

10. The electronic device of claim 1, wherein the partner device is any of an image capture device, a portable information device, a portable radiographic image converter, or an image reading device that reads image data from a portable radiographic image converter.

11. The electronic device of claim 1, wherein the suppression member is an absorption member that absorbs the majority of the irradiated laser light.

12. The electronic device of claim 11, wherein the absorption member is any of a flocked member, a porous material, or a member having a black surface.

13. The electronic device of claim 8, wherein the suppression member is a light emission member comprising a portion that emits light in the visible region when irradiated with the non-visible laser light.

* * * * *